United States Patent [19]

Tamura

[11] Patent Number: 6,026,507
[45] Date of Patent: Feb. 15, 2000

[54] DECODER FOR SUPPRESSING ERROR PROPAGATION

[75] Inventor: Tetsuya Tamura, Yamato, Japan

[73] Assignee: International Business Machines Corporation, Armonk, N.Y.

[21] Appl. No.: 08/787,595

[22] Filed: Jan. 22, 1997

[30] Foreign Application Priority Data

Jan. 22, 1996 [JP] Japan .................................. 8-007951

[51] Int. Cl.$^7$ ........................... G06F 11/10; H03M 13/12
[52] U.S. Cl. ........................................ 714/786; 714/799
[58] Field of Search .................... 371/43.1, 48; 714/786, 714/799

[56] References Cited

U.S. PATENT DOCUMENTS

| | | | |
|---|---|---|---|
| 4,945,538 | 7/1990 | Patel | 371/43 |
| 5,748,023 | 5/1998 | Hassner et al. | 327/336 |

OTHER PUBLICATIONS

"A New Digital Signal Processing Channel For Data Storage Products" by A. Patel EEE Transactions on Magnetics vol. 27, No. 6, Nov. 1991.

"A Closed Set Of Normal Orthogonal Functions" By J. Walsh.

*Primary Examiner*—Phung M. Chung
*Attorney, Agent, or Firm*—G. Marlin Knight

[57] ABSTRACT

The present invention provides a method and apparatus for suppressing error propagation. A decoder comprises a plurality of product-sum arithmetic units each for performing a predetermined product-sum operation for a value of an input signal. An inside-outside judging means judges whether the result of the operation performed by each of the plurality of product-sum arithmetic units is within a predetermined range and outputs an inside-outside judgment. A selecting means selects the predetermined range, based on a known bit sequence and a coding method. An error judging means judges whether the selecting means selected an incorrect range, using the selected predetermined range, the inside-outside judgment, and the value of the input signal. The present invention can prevent mistakes in selecting the predetermined range and also prevent differences between the decoded and original data from influencing a subsequent bit sequence.

17 Claims, 17 Drawing Sheets

Clock

Analog input signal

CK 0

Ts

CK 1 $^+_-$

CK 2 $^+_-$

CK 3 $^+_-$

DECODER FOR SUPPRESSING ERROR PROPAGATION

FIELD OF THE INVENTION

The present invention relates to a unit for suppressing error propagation, in partial response maximum likelihood (PRML) used in processing a signal read out from a magnetic storage medium.

BACKGROUND OF THE INVENTION

In general, it is impossible to completely remove errors in decoding. If an error, which occurs once, infinitely affects data to be decoded thereafter (decoder such as this is said to be catastrophic), efficient data tranfer will become impossible. This is because the number of data bits to be transferred must be sufficiently reduced so that errors do not occur. In practice, when a convolutional code is used as a recording code, there are some cases where the convolutional code will have an infinite influence on decoded data. Therefore, in such a case, special consideration has to be given to a sequence of generated signals.

The reason why the aforementioned inconvenience occurs is because there is memory in a channel, so this inconvenience occurs not only in a digital channel but in an analog channel. Particularly, in a case where a signal from a magnetic storage medium is processed, the inter-symbol interference corresponds to the memory of the channel and there is the possibility that errors will infinitely propagate.

Even if there were a possibility such as this, the use of PRML using inter-symbol interference positively would become very important for realizing higher recording density and faster transmission speed in a magnetic storage unit such as a hard-disk drive unit.

In PRML, the value of a likelihood function calculated in some form is compared with a certain reference value in order to decode original data. In a case where there are a plurality of reference values, it is to be checked whether the value of the likelihood function is within a certain decision area. If inter-symbol interference does not occur in a received signal, the aforementioned reference value will always be constant. However, in a case where inter-symbol interference exists, the reference value must be changed in correspondence with data pattern decoded before a signal to be decoded, or the influence of the inter-symbol interference must be removed from a received signal to calculate a likelihood function. Now consider the former case. In a case where a mistaken reference value is selected for some influence, a previously decoded data pattern is varied by the error, and consequently, there is the possibility that error propagation will infinitely continue.

As a conventional method for suppressing error propagation, there are the following methods used in magnetic recording.

(1) Propagation suppressing method where bit missing or bit insertion is detected by always checking the polarity of a received signal when decoding the signal. This method is described in Arvind M. Patel, "A New Digital Signal Processing Channel for Data Storage Product," IEEE Transaction on magnetic Vol. 27, No. 6, November 1991.

The method cannot cope with a case where peak shift, which is not bit missing or bit insertion, occurs. By way of example, there is a case where +1, 0, −1, 0, +1, and 0 are shifted to 0, +1, 0, −1, 0, and +1.

(2) Method where a decoder is reset or synchronization is recovered by burying specific patterns in data bits and thereby cutting off inter-symbol interference. If a method such as this is used, this method cannot be realized at all times while holding the capacity of the channel of a code to more than a certain level. Specifically, in the (1, 7) RLL (run-length-limited) recording codes, the logical limit of the channel capacity is 0.6793 (see Kees A. Schouhamer, "Coding Technique for Digital Recorders," Immink) and therefore the code rate constitutes ⅔ of data bits. However, if specific patterns are buried, then the logical limit will be considerably reduced and the code whose rate is ⅔ has not been constituted.

(3) Method which allows error propagation to occur at specific patterns and where data are randomized so as to prevent such pattern form continuously occurring. In practice, this method is widely used, but it is a probabilistic method and the propagation length is comparatively long.

SUMMARY OF THE INVENTION

As described above, in background art, there is no method for suppressing error propagation in using it in PRML.

Accordingly, an object of the present invention is to provide an error propagation suppressing method which is effective in using it in PRML.

Another object is to provide a mechanism for judging whether a suitable reference value was selected in changing the reference value of PRML.

To achieve the aforementioned objects, the present invention has the following construction. That is, a decoder for suppressing error propagation of the present invention has a plurality of product-sum arithmetic units each for performing a predetermined product-sum operation for a value of a signal read out from a storage medium; judging means for judging whether the result of the operation performed by each of the plurality of product-sum arithmetic units is within an appropriate predetermined range, respectively; selecting means for selecting the appropriate predetermined range from predetermined ranges, based on a read bit sequence already known and a coding method being used; and error judging means for judging whether an incorrect range is selected by the selecting means, by using the appropriate predetermined range selected by the selecting means, the inside-outside judgment of the judging means, and the value of the signal read out from the recording medium. With this, the predetermined range can be prevented from being selected by mistake and decoded data can be prevented from differing from the original data and from having an influence on a subsequent bit sequence.

Also, the aforementioned error judging means may include means for determining whether the result of the operation performed by each of the plurality of product-sum arithmetic units is outside a distribution corresponding to the predetermined range selected by the selecting means. The result of the operation has a predetermined distribution and a predetermined range corresponding to the distribution is set. Therefore, in a case where a result of the operation being outside the predetermined range corresponding to the distribution is input, the selection of the predetermined range is in error and, in some cases, a different decoding result will occur.

In addition, the decoder of the present invention may further include second judging means for determining whether the result of the operation belongs to a range where the inside-outside judgment of the judging means becomes a different result, when the result of the operation is outside the distribution. This is because, even if the result of the operation were outside the distribution, there would be some cases where the result of the operation is the same.

Furthermore, the determining means may include a product-sum arithmetic unit for making sure that the result of the operation is outside the distribution, by using the value of the signal read out from the storage medium. By newly performing product-sum operation, the judgment of whether the result of the operation is outside the distribution can be facilitated.

Figure 1:
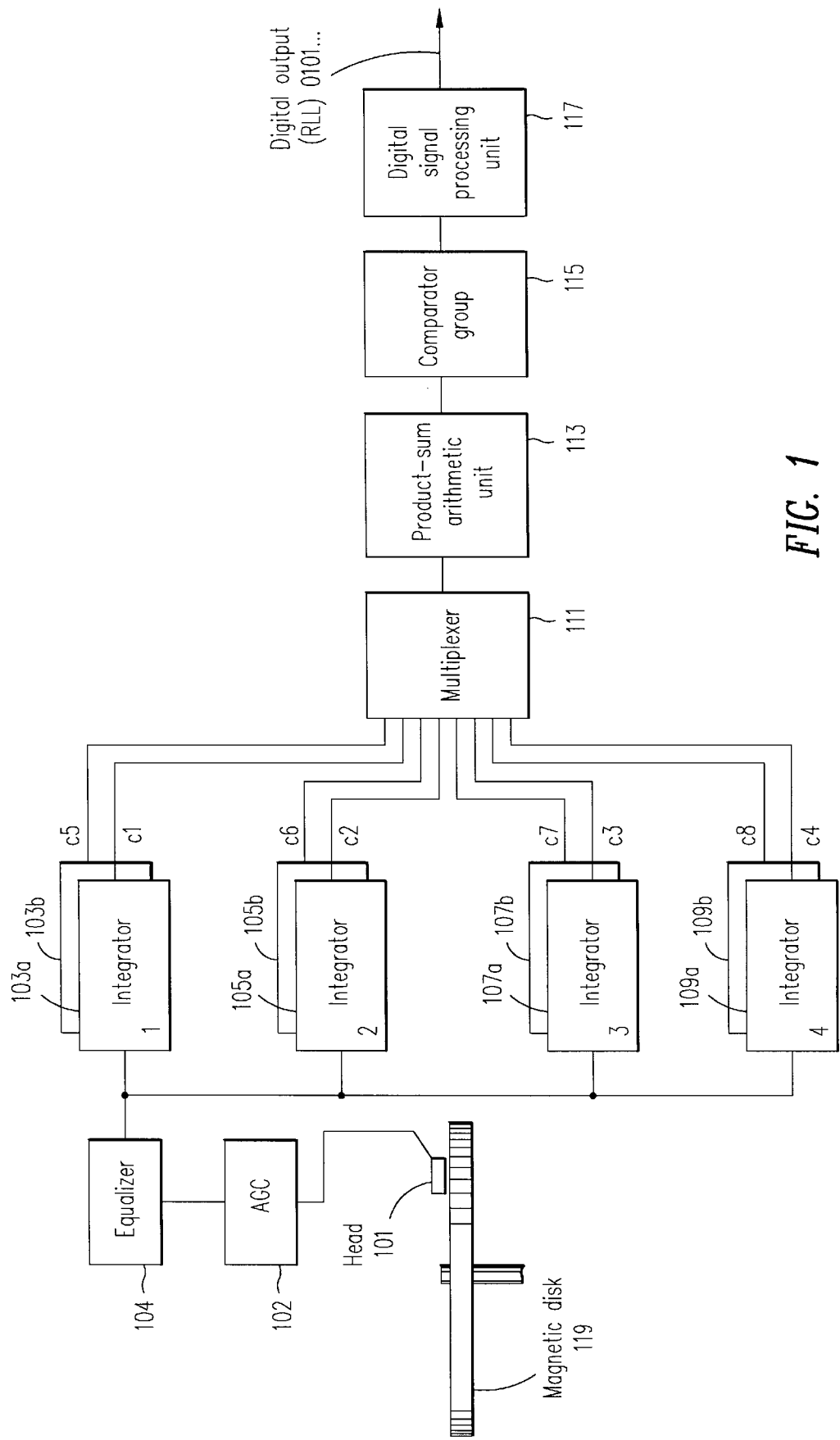
FIG. 1 is a block diagram showing the entire system based on the present invention.

Description of symbols:

101 . . . head
102 . . . AGC
104 . . . equalizer
103 through 109 . . . integrator
111 . . . multiplexer
113 . . . product-sum arithmetic unit group
115 . . . comparator group
117 . . . digital signal processing unit
301 through 307 . . . product-sum arithmetic unit
311 through 317 . . . comparator
401 through 407 . . . selector
409 through 415 . . . selection signal generator
417 . . . latch
419 . . . latch
501 through 507 . . . boundary checking unit
509 through 515 . . . product-sum arithmetic unit F4

DETAILED DESCRIPTION OF THE PREFERRED EMBODIMENT

First, a system based on the present invention will be described. To be concrete, the outline of a symbol detection channel is to be shown. This is shown in detail in U.S. patent application Ser. No. 489,863 (filed on Jun. 13, 1995). The magnetic recording method used in this symbol detection channel is given by EEPR4, that is, a polynomial, $(1-D)(1+D)^3$.

FIG. 1 shows a block diagram of the entire system. A head 101 reads out, for example, a magnetic signal from a magnetic disk 119 and converts it to an electrical signal. The head 101 is connected to an AGC 102, which in turn is connected to an equalizer 104. The equalizer 104 is connected to integrators 103$a$ and 103$b$, integrators 105$a$ and 105$b$, integrators 107$a$ and 107$b$, and integrators 109$a$ and 109$b$. The suffixes a and b indicate they are alternately used. In this embodiment, the output of the integrator 103$a$ is represented by c1, the output of the integrator 105$a$ by c2, the output of the integrator 107$a$ by c3, the output of the integrator 109$a$ by c4, the output of the integrator 103$b$ by c5, the output of the integrator 105$b$ by c6, the output of the integrator 107$b$ by c7, and the output of the integrator 109$b$ by c8.

A group of these integrators 103$a$ through 109$b$ is connected to a multiplexer 111. The multiplexer 111 is connected to 12 product-sum arithmetic units of a product-sum arithmetic unit group 113 so that the outputs from the group of integrators 103$a$ through 109$b$ can be selectively distributed in advance. The product-sum arithmetic unit group 113 is connected to a comparator group 115 constituted by 24_3 comparators. The outputs of this comparator group 115 are processed in a digital signal processing unit 117, which outputs a digital signal to a subsequent process.

Figure 2A:
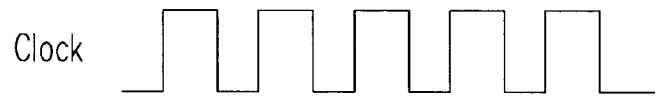
FIGS. 2(a) through 2(f) are diagrams showing an example of the signals which are processed in the integrators shown in FIG. 1.
Figure 2B:
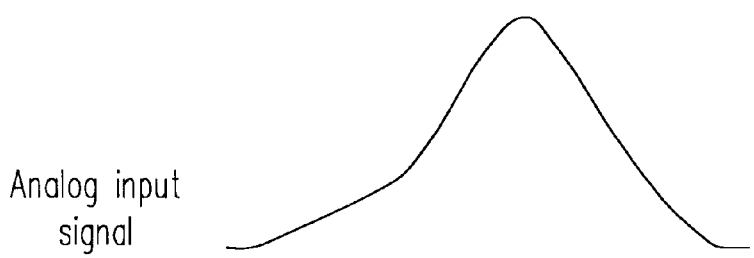
Figure 2C:
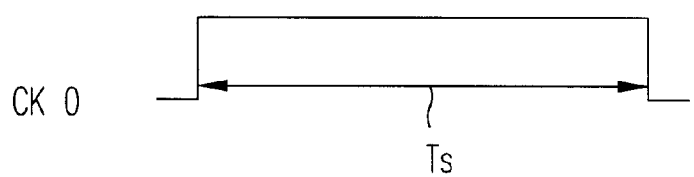
Figure 2D:
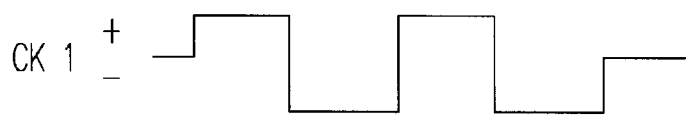
Figure 2E:
Figure 2F:

In this system, first, the head 101 converts a magnetic signal to an electrical signal and outputs an analog signal, as previously described. This analog signal is converted to a suitable signal by the AGC 102 and the equalizer 104. The AGC 102 and the equalizer 104 are the same as those being normally used and therefore they will not be described any further. The signal from the equalizer 104 has, for example, a waveform such as that shown in FIG. 2(b). This analog signal, as it is, is output to the integrators 1 through 4, and the integral time and window function of the integrators are shown in FIGS. 2(c), (d), (e), and (f). In a case where this symbol detection channel is used, an integral operation is performed, but the exact same description would apply even if a value sampled for each bit were used. As previously described, the reason why each integrator includes two integrator sections is because a single symbol is decoded in view of intersymbol interference and because the integrated value of two consecutive symbols (i.e., amount of 8 bits) is employed. Specifically, the integrator b is used for integrating during the next time interval $T_s$ after the integrator a performs an integral operation. If done in this way, a Walsh conversion meeting a Walsh function will be executed. For this Walsh function, see J. L. Walsh, "A Closed Set of Normal Orthogonal Functions, "American Journal of Mathematics, Vol 45, 1923, pp. 5–24." Note that, if the window function is changed to some other normal orthogonal system, a conversion differing from the Walsh conversion will be made, but it can also be used in decoding.

The analog outputs of the integrators are distributed to the product-sum arithmetic unit group (likelihood function or matched filter) through the multiplexer 111. That is, the results of the integral operations that the product-sum arithmetic units require are different from each other. In each product-sum arithmetic unit, the aforementioned necessary integration results are multiplied and added with necessary coefficients (which have been previously set), and the output of each product-sum arithmetic unit is output to the comparator group 115.

The comparator group 115 judges whether the output of each product-sum arithmetic unit is within a predetermined range. In order to judge whether the output is within a predetermined range, a predetermined reference level has been set. Then, the digital signal processing unit 117 determines which is selected among the judgment results of the comparators. The selected judgment result will become the aforementioned (1, 7) RLL recording codes.

The product-sum arithmetic unit group 113 and the comparator group 115 will be described in detail with FIGS. 3 and 4. The product-sum arithmetic unit group 113 has 12 product-sum arithmetic units, as previously described. Specifically, the group 113 has product-sum arithmetic units 301a, 301b, and 301c, product-sum arithmetic units 303a, 303b, and 303c, product-sum arithmetic units 305a, 305b, and 305c, and product-sum arithmetic units 307a, 307b, and 307c. The calculations that these product-sum arithmetic units perform are expressed by functions $F1(x_1, x_2, x_3, x_4, x_5)$, $F2(x_1, x_2, x_3, x_4, x_5)$, and $F3(x_1, x_2, x_3, x_4, x_5)$.

These functions are expressed as follows:

$$F1 = x_1 + 2x_2 - 2x_4 - x_5,$$

$$F2 = x_1 + 3x_2 + 3x_3 + x_4,$$

and $$F3 = x_1 + 2x_2 - 1.2x_4 + 0.6x_5.$$

Figure 3:
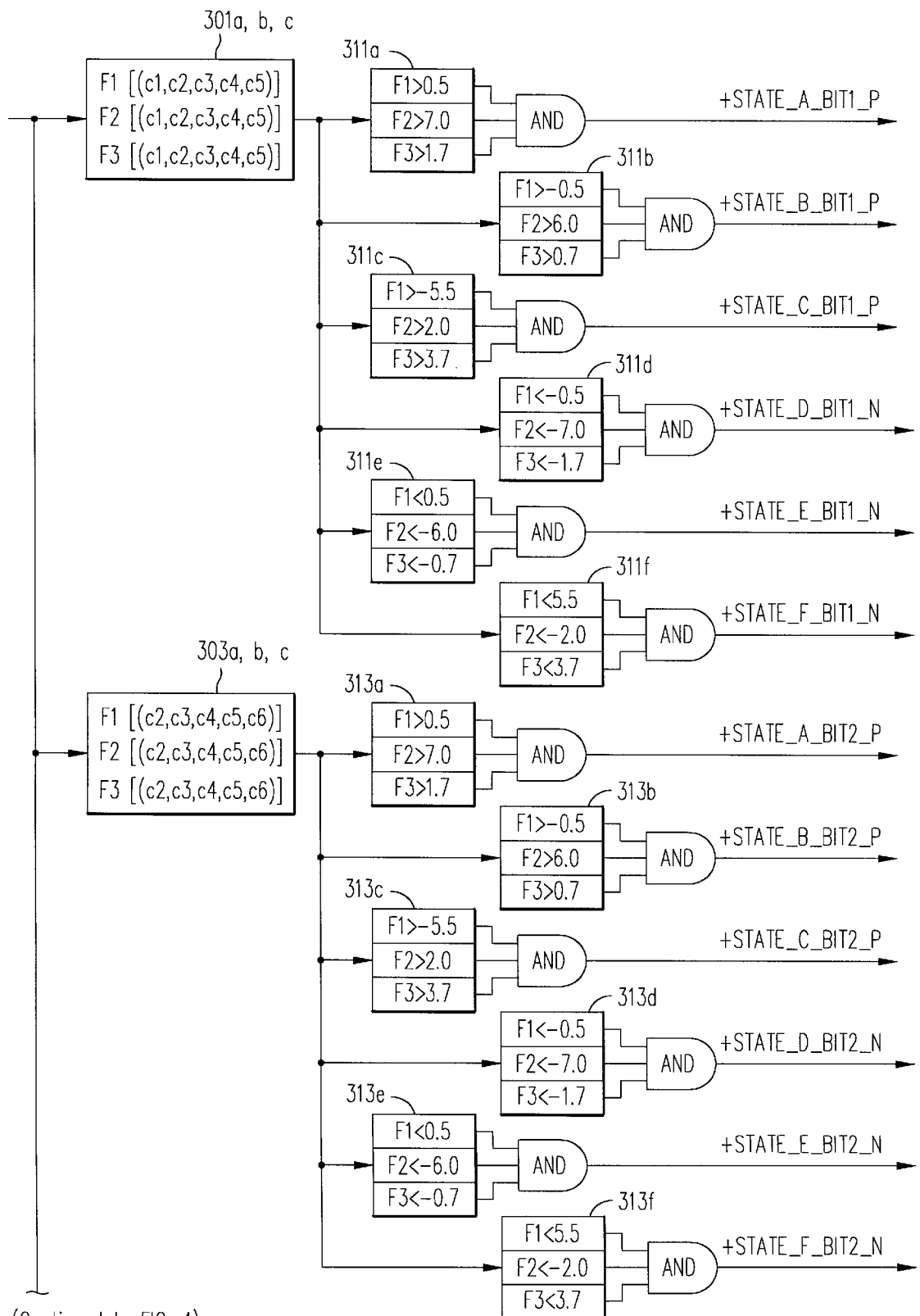
FIG. 3 is a diagram showing the details of the product-sum arithmetic unit group 113 and the comparator group 115 in FIG. 1, along with FIG. 4.
Figure 4:
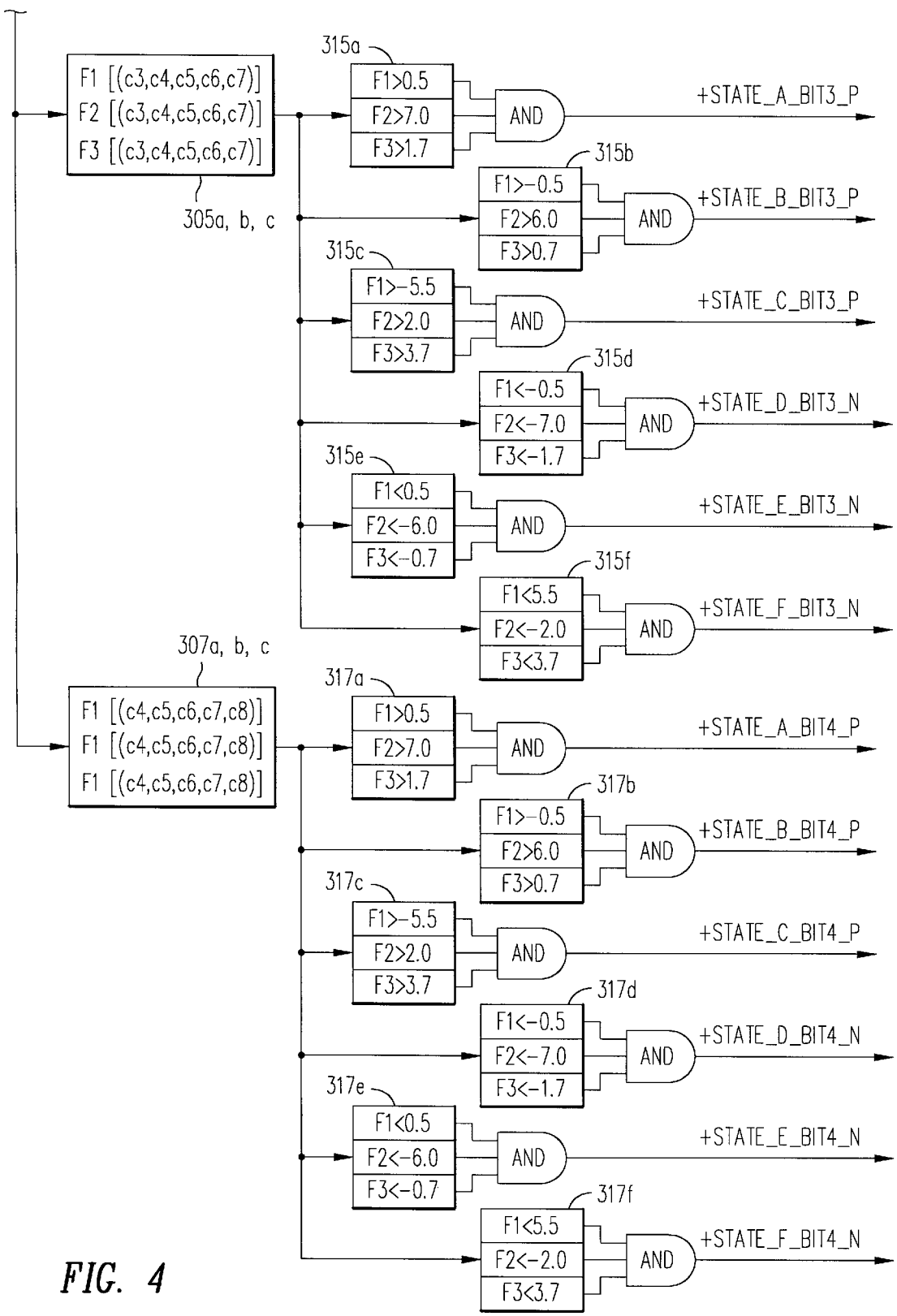
FIG. 4 is a diagram showing the details of the product-sum arithmetic unit group 113 and the comparator group 115 in FIG. 1, along with FIG. 3.

As shown in FIGS. 3 and 4, the results of the integral operations used in the product-sum arithmetic units differ from each other. That is, in the product-sum arithmetic units 301a, 301b, and 301c, the aforementioned c1, c2, c3, c4, and c5 are used and calculation is performed with the functions F1, F2, and F3. Also, in the product-sum arithmetic units 303a, 303b, and 303c, the c2, c3, c4, c5, and c6 are used and calculation is performed with the functions F1, F2, and F3. Furthermore, in the product-sum arithmetic units 305a, 305b, and 305c, the c3, c4, c5, c6, and c7 are used. Finally, in the product-sum arithmetic units 307a, 307b, and 307c, the c4, c5, c6, c7, and c8 are used.

The results of the product-sum operations calculated in this way are output to the comparator group 115. The calculation results of the product-sum arithmetic units 301a, 301b, and 301c are output to the comparators 311a, 311b, 311c, 311d, 311e, and 311f. Each comparator judges whether the calculation result is within a predetermined range. Also, the calculation results of the product-sum arithmetic units 303a, 303b, and 303c are output to the comparators 313a, 313b, 313c, 313d, 313e, and 313f. Furthermore, the calculation results of the product-sum arithmetic units 305a, 305b, and 305c are output to the comparators 315a, 315b, 315c, 315d, 315e, and 315f. Finally, the calculation results of the product-sum arithmetic units 307a, 307b, and 307c are output to the comparators 317a, 317b, 317c, 317d, 317e, and 317f.

Each of the comparators 313a through 317f can be divided into three comparators and three predetermined values have been set for the three comparators (see FIGS. 3 and 4). The three values constitute a decision boundary which is a boundary of an area. In a case where the outputs of the three comparators are all high, the result of the product-sum operation is within a predetermined range (area) and is output through an AND circuit. For making the following description easier, the name of each output shown in FIGS. 3 and 4 will be used. For example, the output of the comparator 311a, "+STATE_A_BIT1_P," implies that the state of the inter-symbol interference is "A" (i.e., the decision boundary is "A") and that the output at that time is "bit 1." If the output is high, it will become 1. Also, if it is high, last word, P, will imply +1, and if the last word is N and it is high, it will imply −1.

Figure 5:
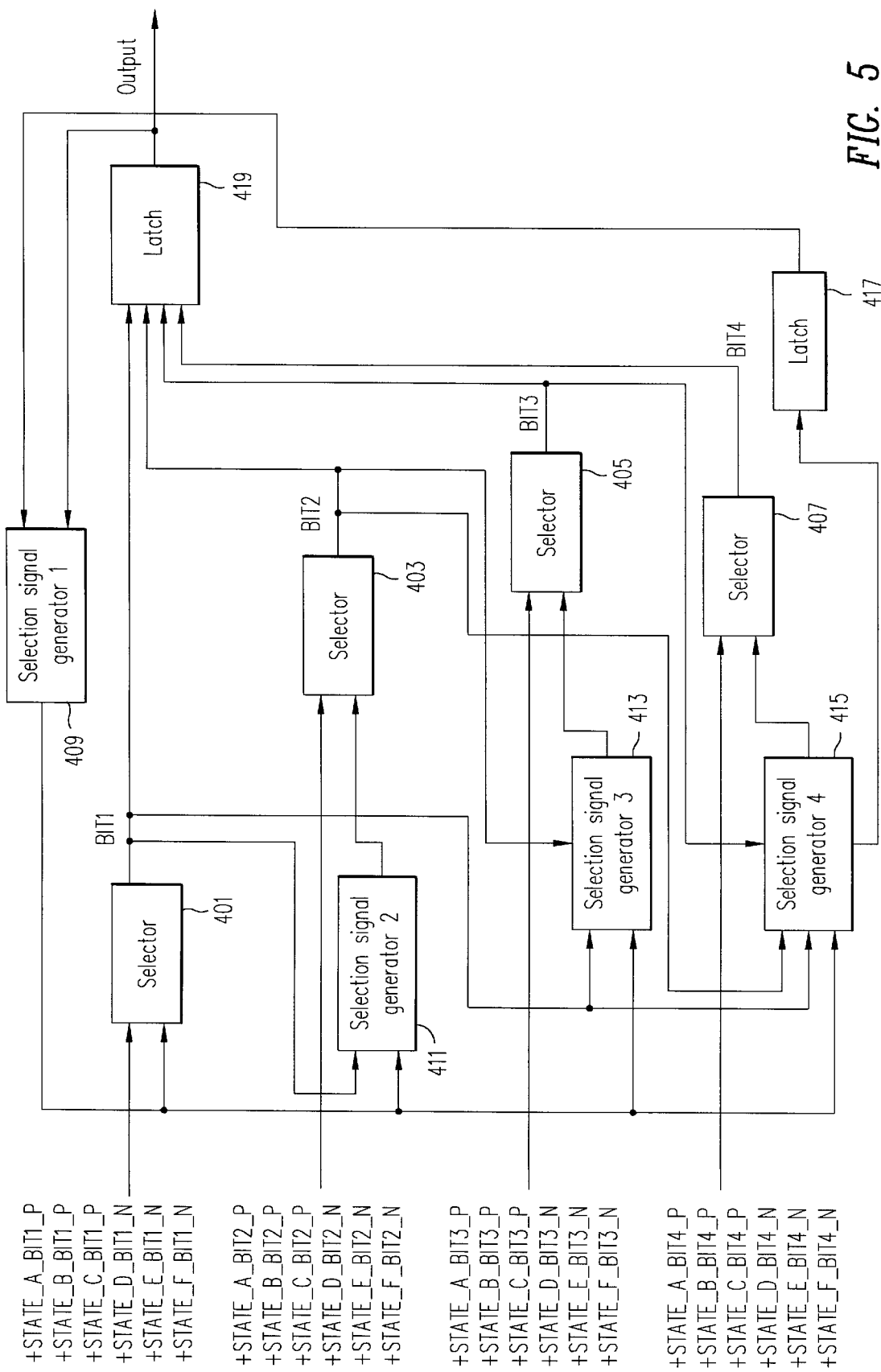
FIG. 5 is a block diagram showing the details of the digital signal processing unit 117 in FIG. 1.

The details of the digital signal processing unit 119 shown in FIG. 1 will next be shown in FIG. 5. The outputs of the comparators connected to the product-sum arithmetic unit 301 are connected to a selector 401. The selector 401 is connected to a selection signal generator 1 (409) so that one of the outputs of the comparators can be selected by the output of this selection signal generator 1 (409). Also, the outputs of the comparators connected to the product-sum arithmetic unit 303 are connected to a selector 403. The selector 403 is connected to a selection signal generator 2 (411) so that one of the outputs of the comparators can be selected by the output of this selection signal generator 2 (411). Likewise, the outputs of the comparators connected to the product-sum arithmetic unit 305 are connected to a selector 405, and the outputs of the comparators connected to the product-sum arithmetic unit 307 are connected to a selector 407. In the same way, the outputs of the comparators are selected by the outputs of a selection signal generator 3 (413) and a selection signal generator 4 (415), respectively.

The selection signal generator 1 (409) is connected to the output of the digital signal processing unit 119 and also to the selection signal generator 4 (415). Also, the selection signal generator 2 (411) is connected to the selection result of the selector 401 and the selection signal generator 1 (409). Furthermore, the input of the selection signal generator 3 (413) is connected to the selection results of the selectors 401 and 403 and the output of the selection signal generator 1 (409). The selection signal generator 4 (415) is connected to the selection results of the selectors 401, 403, and 405 and the selection signal generator 1 (409). Finally, the outputs of the selectors 401 through 407 are connected to the latch 419 so that the outputs are output in sequence as bit 1 from the selector 419.

First, the selection signal generator 1 (409) judges the state of the inter-symbol interference from the output of the digital signal processing unit 119 and the output of the selection signal generator 4 and selects one of the states A through F. That is, depending upon whether a signal line selected indicates high or low, the output of bit 1 is determined. The data of the bit 1 obtained in this way is output to the selection signal generator 2 (411). The selection signal generator 2 (411) selects a state which should be output as bit 2 from the output of the selection signal generator 1 (409) in addition to the data of the bit 1. Furthermore, in the selection signal generator 3 (413), a state to be selected is selected from and among A through F, based on the outputs of the selectors 401 and 403 and the content of the selection signal generator 1 (409). The selection signal generator 4 (415) selects a suitable state as bit 4 from the selection signal generator 1 (409) and the outputs of the selectors 401 through 405. Note that, while each selection signal generator and each selector select a state, it can also be said that the condition (range) set to a previous comparator is selected.

Note that what selection is performed with the selection signal generators and the selectors, depending upon the kind of a sequence of decoded bits, is not directly related to the present invention. Therefore, it will not be described in detail. The details are described in the aforementioned U.S. patent application. However, an example will be shown as follows.

TABLE 1

| Bit | State | Result | F1 | F2 | F3 |
|---|---|---|---|---|---|
| 1 | A | 0 | 14.0 | 0.0 | −1.6 |
| 2 | A | 1 | 14.0 | 13.0 | 8.2 |
| 3 | Y | 0 | 1.0 | 9.0 | 10.6 |
| 4 | F | −1 | −8.0 | −8.0 | −3.2 |
| 5 | X | 0 | 0.0 | −8.0 | −9.6 |
| 6 | C | 1 | 8.0 | 8.0 | 3.2 |
| 7 | Y | 0 | 0.0 | 8.0 | 9.6 |
| 8 | F | −1 | −8.0 | −8.0 | −3.2 |
| 9 | X | 0 | 0.0 | −8.0 | −9.6 |
| 10 | C | 1 | 8.0 | 8.0 | 3.2 |
| 11 | Y | 0 | 0.0 | 8.0 | 9.6 |
| 12 | F | −1 | −8.0 | −8.0 | −3.2 |
| 13 | X | 0 | 0.0 | −8.0 | −9.6 |
| 14 | C | 1 | 8.0 | 8.0 | 3.2 |
| 15 | Y | 0 | 0.0 | 8.0 | 9.6 |
| 16 | F | −1 | −8.0 | −9.0 | −2.6 |

In Table 1, X and Y described in the state column are states determined from the (1, 7) RLL recording codes and are inevitably determined.

In a case where, in a decoder such as this, the output of the selection signal generator is in error for some influence, there are also some cases where the error will have a great influence on subsequent decoding result and the decoder will be oscillated. The following case is taken as an example.

TABLE 2

| Bit | State | Result | F1 | F2 | F3 | F4 | Error |
|---|---|---|---|---|---|---|---|
| 1 | A | 0 | 14.0 | 0.0 | −1.6 | 0.2 | |
| 2 | A | 1 | 16.0 | 7.0 | 7.0 | 2.0 | |
| 3 | Y | 0 | 9.0 | 5.0 | 8.2 | −1.0 | |
| 4 | F | 0 | 4.0 | −4.0 | 0.8 | −2.8 | |
| 5 | E | 0 | 8.0 | −2.0 | −3.6 | −0.8 | |
| 6 | D | 0 | 10.0 | 10.0 | 5.2 | 2.8 | |
| 7 | D | 0 | 0.0 | 8.0 | 9.6 | 0.8 | |
| 8 | D | 0 | −8.0 | −8.0 | −3.2 | −4.8 | |
| 9 | D | 0 | 0.0 | −8.0 | −9.6 | −0.8 | |
| 10 | D | 0 | 8.0 | 8.0 | 3.2 | 4.8 | |
| 11 | D | 0 | 0.0 | 8.0 | 9.6 | 0.8 | |
| 12 | D | 0 | −8.0 | −8.0 | −3.2 | −4.8 | |
| 13 | D | 0 | 0.0 | −8.0 | −9.6 | −0.8 | |

TABLE 2-continued

| Bit | State | Result | F1 | F2 | F3 | F4 | Error |
|---|---|---|---|---|---|---|---|
| 14 | D | 0 | 8.0 | 8.0 | 3.2 | 4.8 | |
| 15 | D | 0 | 0.0 | 8.0 | 9.6 | 0.8 | |
| 16 | D | 0 | −8.0 | −9.0 | −2.6 | −4.8 | |

Table 2 shows a case where the signal waveform at the position corresponding to bit 6 is distorted for some influence and where, consequently, errors occur in the decoding result and the decision boundary has also been oscillated due to the errors. In order to calculate the F1, F2, and F3 of a certain bit, as previously described in FIGS. 3 and 4, a signal waveform of four bits ahead from the position of the waveform of that bit is used. That is, in order to calculate bit 1, the value c1 of the signal waveform of bit 1 up to the value c5 of the signal waveform of bit 5 are used. Therefore, in Table 2, the result of the calculation of F1, F2, and F3 in bit 1 is equal to that of Table 1. However, with respect to bit 2 to bit 6 using the value of the waveform of bit 6, the result of the calculation of F1, F2, and F3 in Table 2 differs from that of Table 1. For bit 7 and bits thereafter which are not affected by bit 6, the result of the calculation of F1, F2, and F3 in Table 2 becomes equal to that of Table 1.

Thus, as a result of the signal waveform at the position of bit 6 being distorted, the result of the decoding of bit 4 in Table 1 differs from that of Table 2, and consequently, the decision boundary in bit 5 varies. Thereafter, the decision boundary in Table 1 is entirely different from that in Table 2 even after bit 7 which is not affected by the distortion of the signal waveform. The present invention is constructed as shown in FIG. 6 for preventing an occurrence of such a situation.

Figure 6:
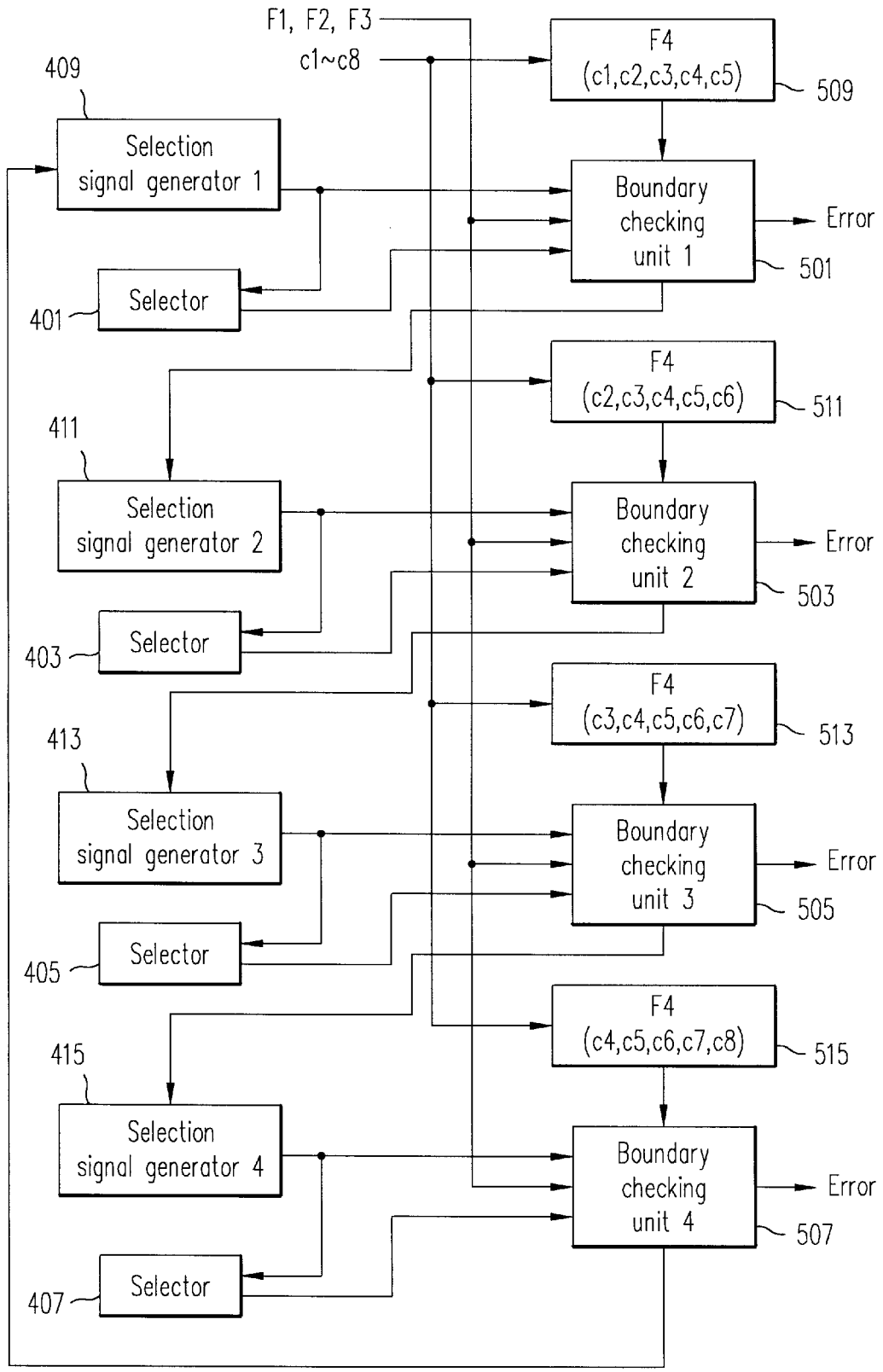
FIG. 6 is a block diagram showing the details of the present invention.

FIG. 6 shows a construction for detecting error propagation such as that shown in Table 2. In FIG. 6, selection signal generators 1 (409) through 4 (415) and selectors 401 through 407 are the same as those shown in FIG. 5 and they are constructed so that the outputs of FIG. 5 are employed. In addition, the F1, F2, and F3 (four kinds for each) calculated in FIGS. 3 and 4 are employed and c1 through c8 are employed. In this embodiment, the results of the product-sum arithmetic units 301a, 301b, and 301c have been input to a boundary checking unit 1 (501). The results of the product-sum arithmetic units 303a, 303b, and 303c have been input to a boundary checking unit 2 (503). The results of the product-sum arithmetic units 305a, 305b, and 305c have been input to a boundary checking unit 3 (505). The results of the product-sum arithmetic units 307a, 307b, and 307c have been input to a boundary checking unit 4 (507). In addition, the output of the selection signal generator 1 (409) is connected to the boundary checking unit 1 (501), the output of the selection signal generator 2 (411) to the boundary checking unit 2 (503), the output of the selection signal generator 3 (413) to the boundary checking unit 3 (505), and the output of the selection signal generator 4 (415) to the boundary checking unit 4 (507). Furthermore, a new function F4 is defined and values c1 through c8 of a signal waveform needed for the new function F4 are input to product-sum arithmetic units 509, 511, 513, and 515. More specifically, c1 through c5 are input to the product-sum arithmetic unit 509. The c2 through c6 are input to the product-sum arithmetic unit 511. The c3 through c7 are input to the product-sum arithmetic unit 513. The c4 through c8 are input to the product-sum arithmetic unit 515. The calculation results of the product-sum arithmetic units 509 through 515 are input to the boundary checking units 1 (501)

through 4 (507), respectively. The newly introduced function F4 ($x_1$, $x_2$, $x_3$, $x_4$, $x_5$) is defined as follows:

$$F4(x_1,x_2,x_3,x_4,x_5)=-x_1+x_2-0.4\_x_4$$

In addition, the output of the selector 401, that is, the decoding result of bit 1 is input to the boundary checking unit 1 (501). The output of the selector 403, that is, the decoding result of bit 2 is input to the boundary checking unit 2 (503). The output of the selector 405, that is, the decoding result of bit 3 is input to the boundary checking unit 3 (505). The output of the selector 407, that is, the decoding result of bit 4 is input to the boundary checking unit 4 (507).

As evident in FIG. 6, each boundary checking unit is a checking unit which judges, from the outputs from the selection signal generators, the decoding results, the output of the new product-sum arithmetic unit, and the outputs of F1, F2, and F3, whether the decoding result of each bit is equal to an error condition. That is, whether the decision boundary used for determining the decoding result of each bit is in error is judged by each boundary checking unit. In a case where the decision boundary is in error, an error signal will be generated for preventing error propagation and sent to a selection signal generator used for next bit. For the boundary checking unit 4 (507), the signal is sent to the selection signal generator 1 (409).

Now, a description will be made of how this boundary checking unit judges whether in what case there is an error.

Figure 7:
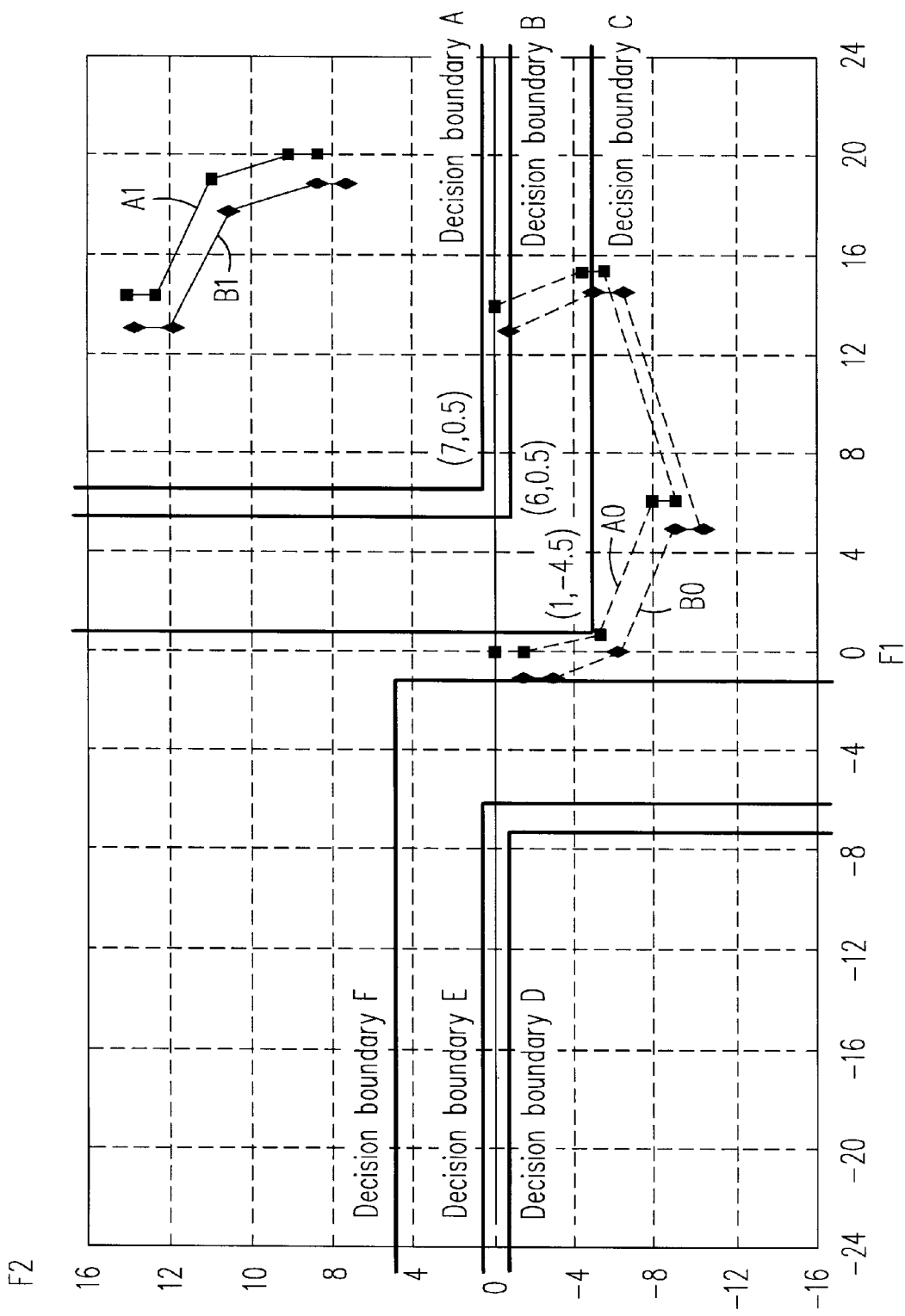
FIG. 7 is a diagram showing the relationship between the values of F1, F2, and F3 and decision boundaries (for signal points A1, A0, B1 and B0)
Figure 8:
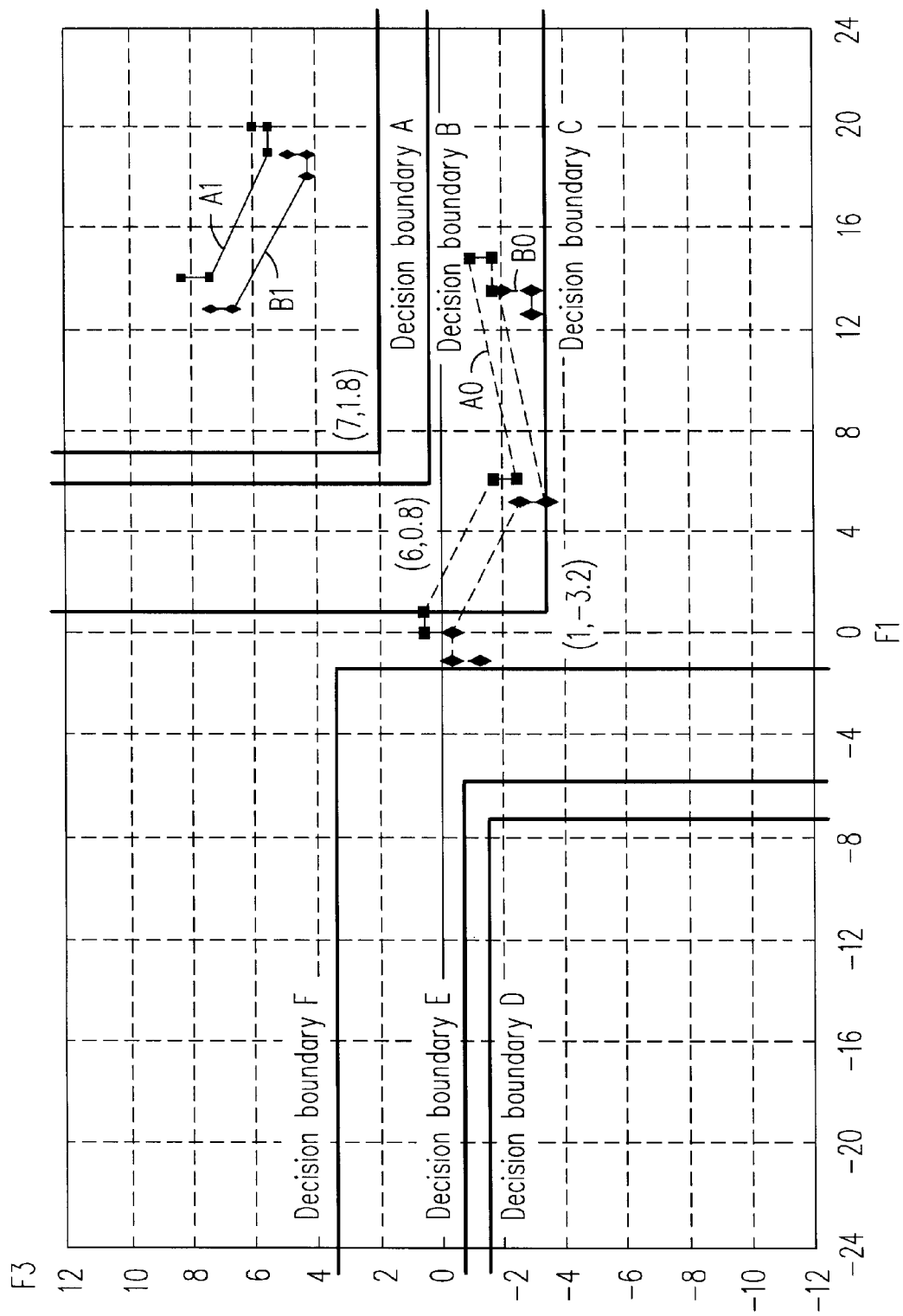
FIG. 8 is a diagram showing the relationship between the values of F1, F2, and F3 and decision boundaries (for signal points A1, A0, B1, and B0)
Figure 9:
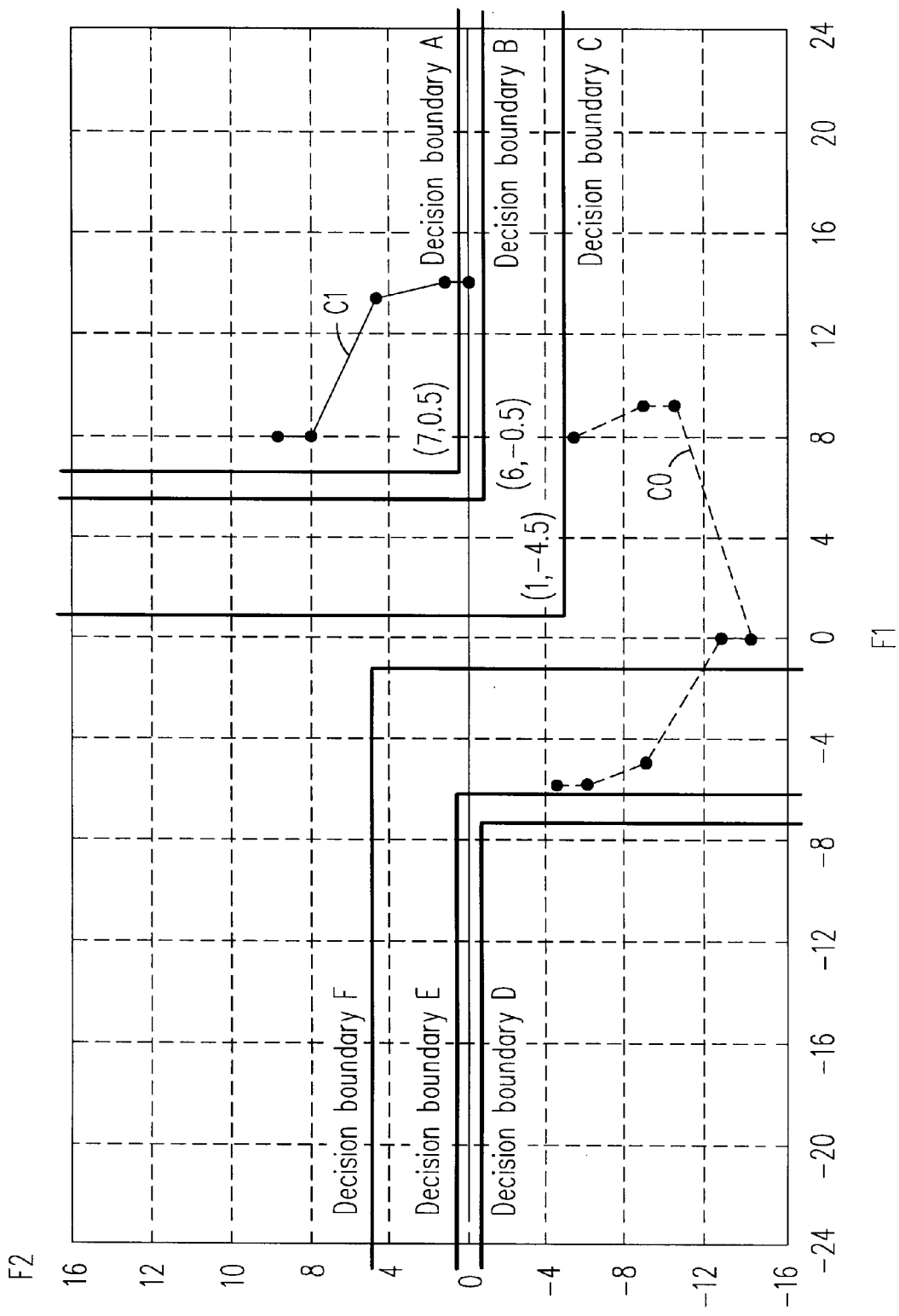
FIG. 9 is a diagram showing the relationship between the values of F1, F2, and F3 and decision boundaries (for signal points C1 and C0)
Figure 10:
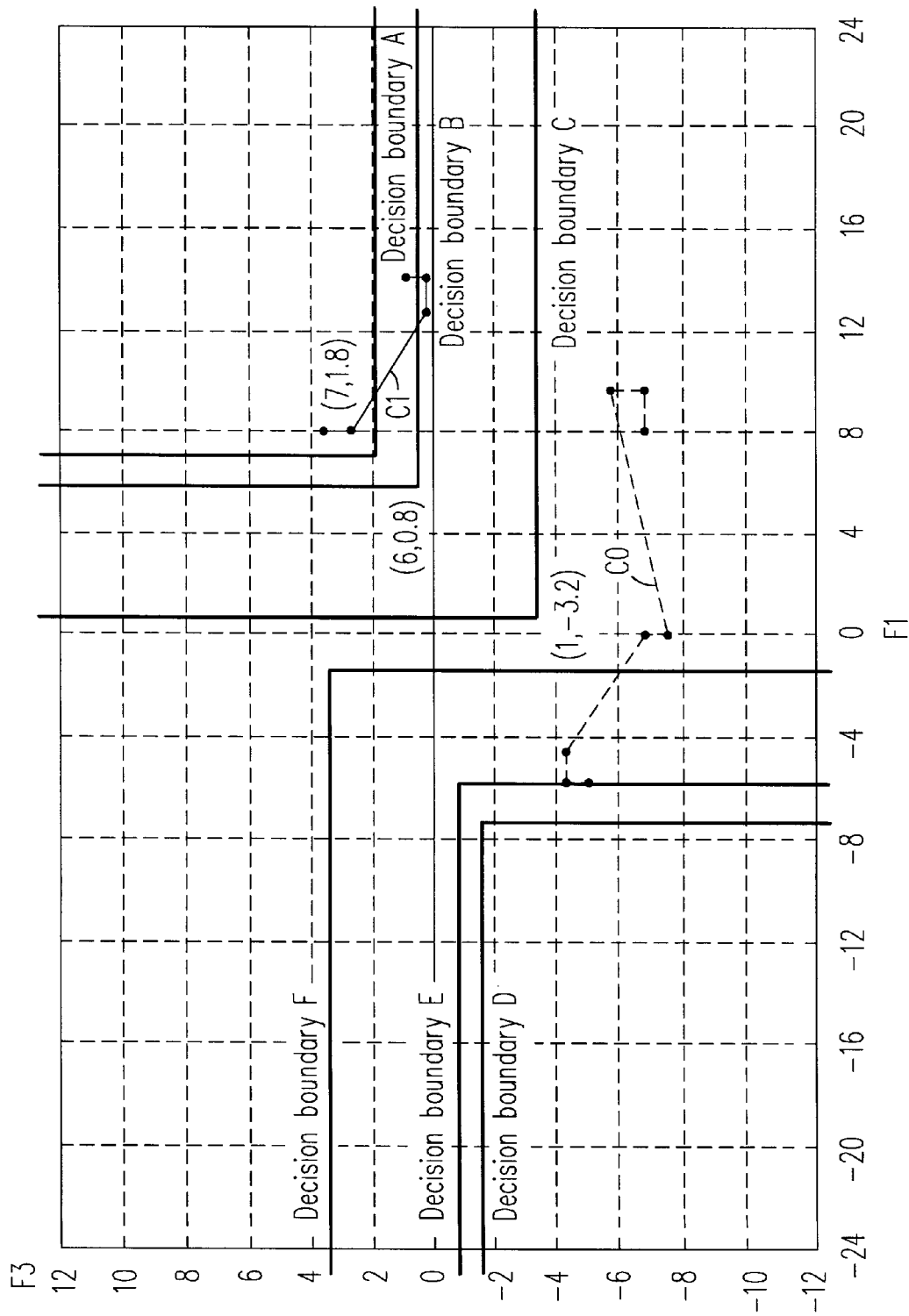
FIG. 10 is a diagram showing the relationship between the values of F1, F2, and F3 and decision boundaries (for signal points C1 and C0)
Figure 11:
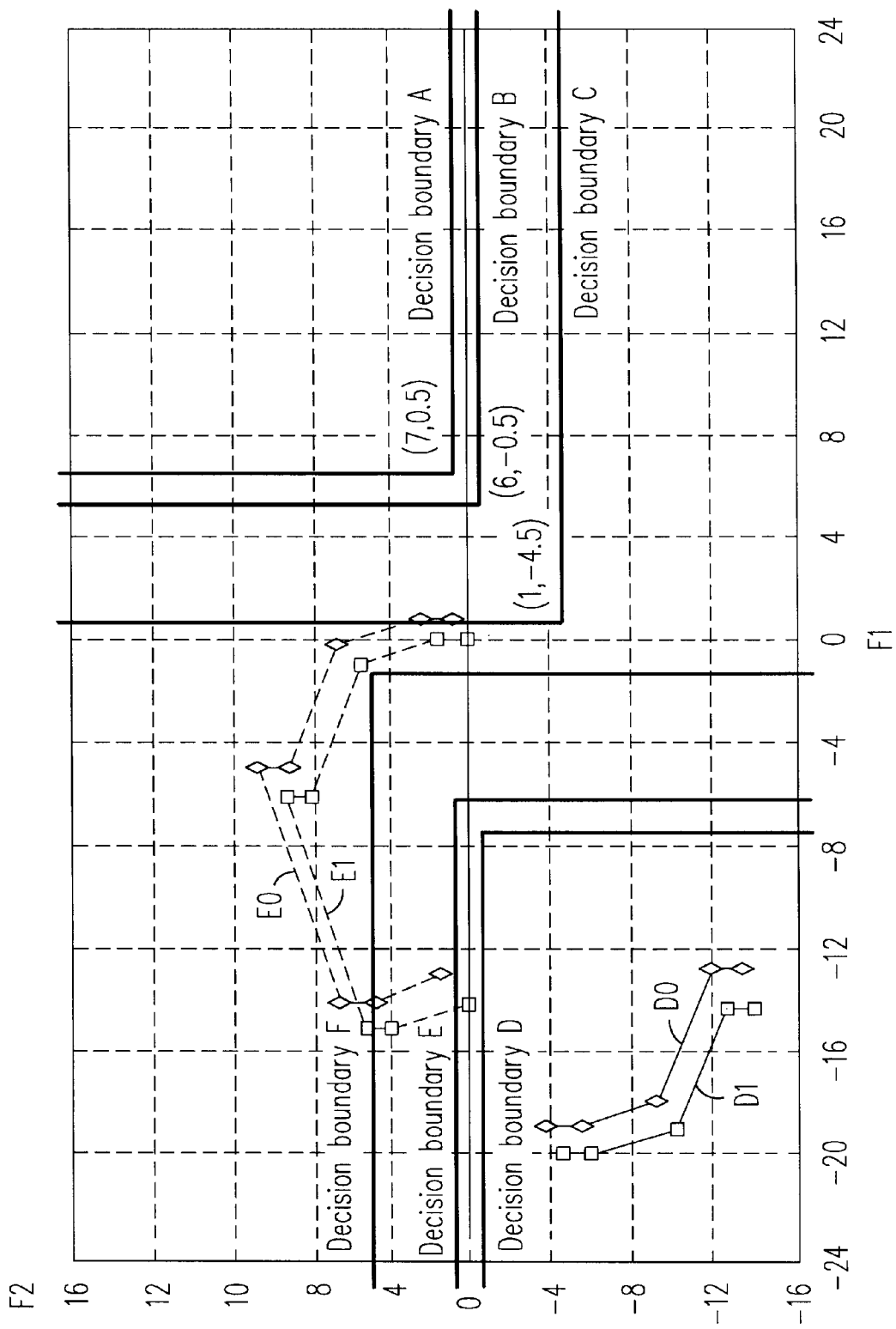
FIG. 11 is a diagram showing the relationship between the values of F1, F2, and F3 and decision boundaries (for signal points D1, D0, E0, and E1)
Figure 12:
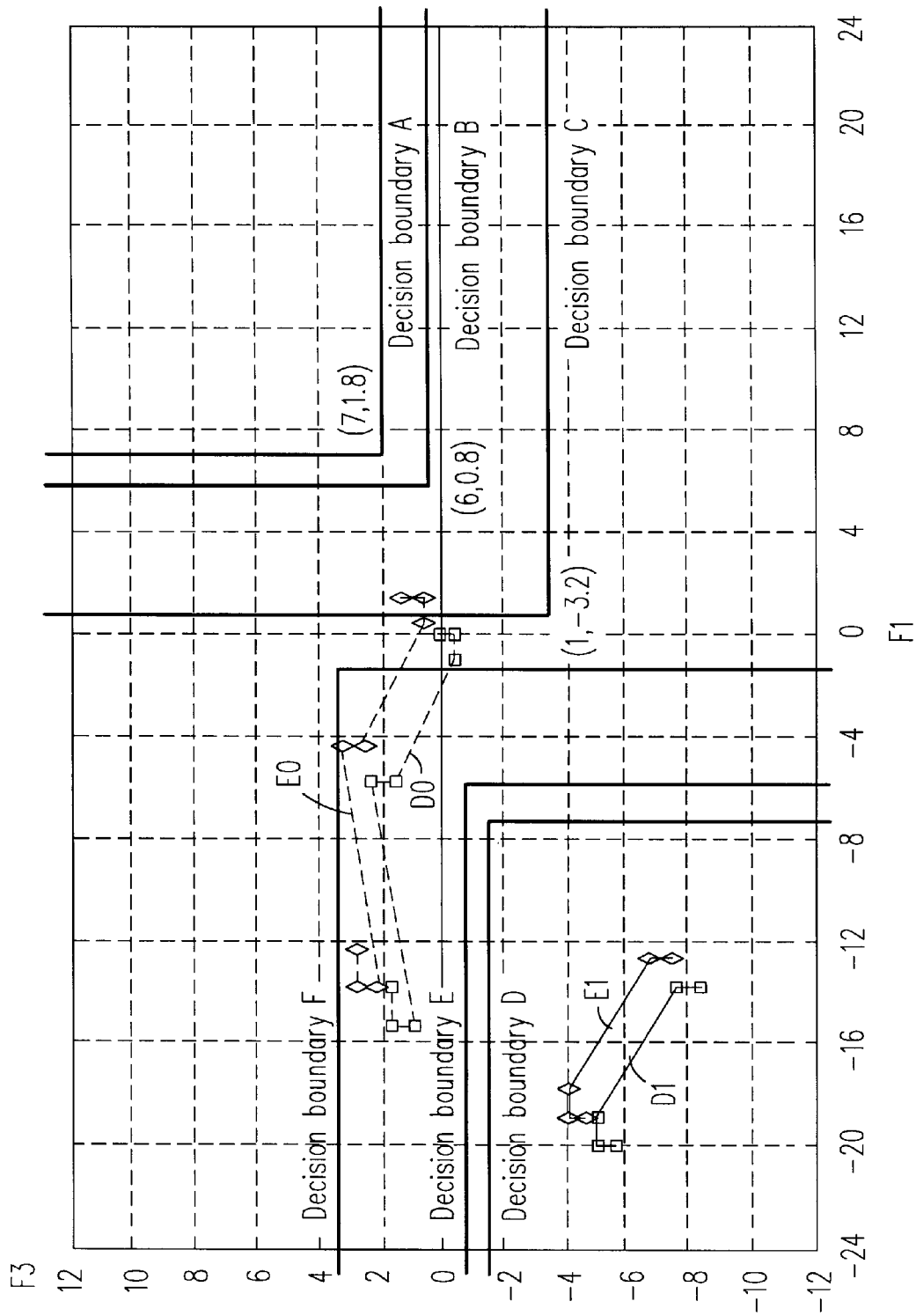
FIG. 12 is a diagram showing the relationship between the values of F1, F2, and F3 and decision boundaries (for signal points D1, D0, E0, and E1)
Figure 13:
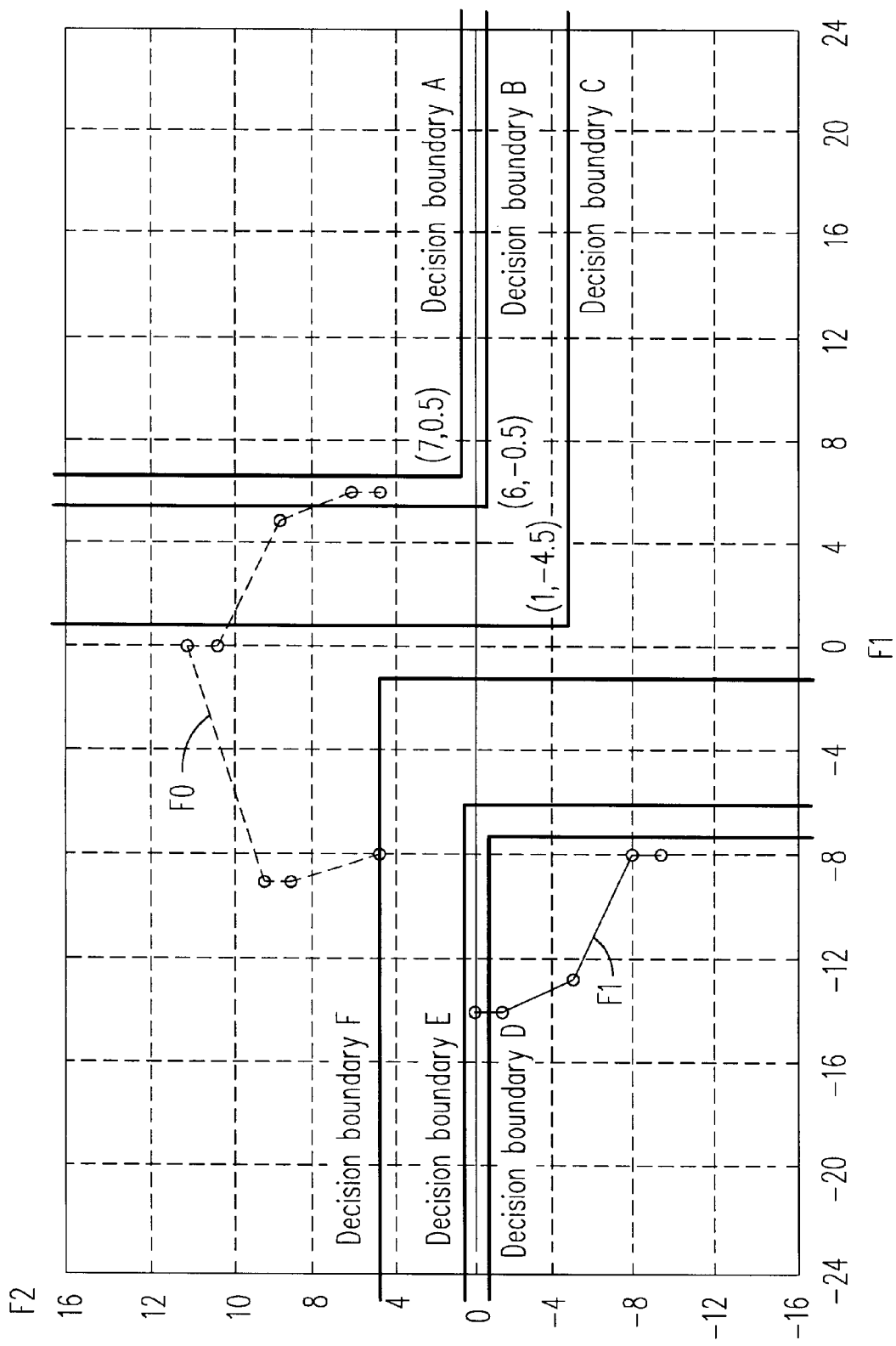
FIG. 13 is a diagram showing the relationship between the values of F1, F2, and F3 and decision boundaries (for signal points F1, and F0)
Figure 14:
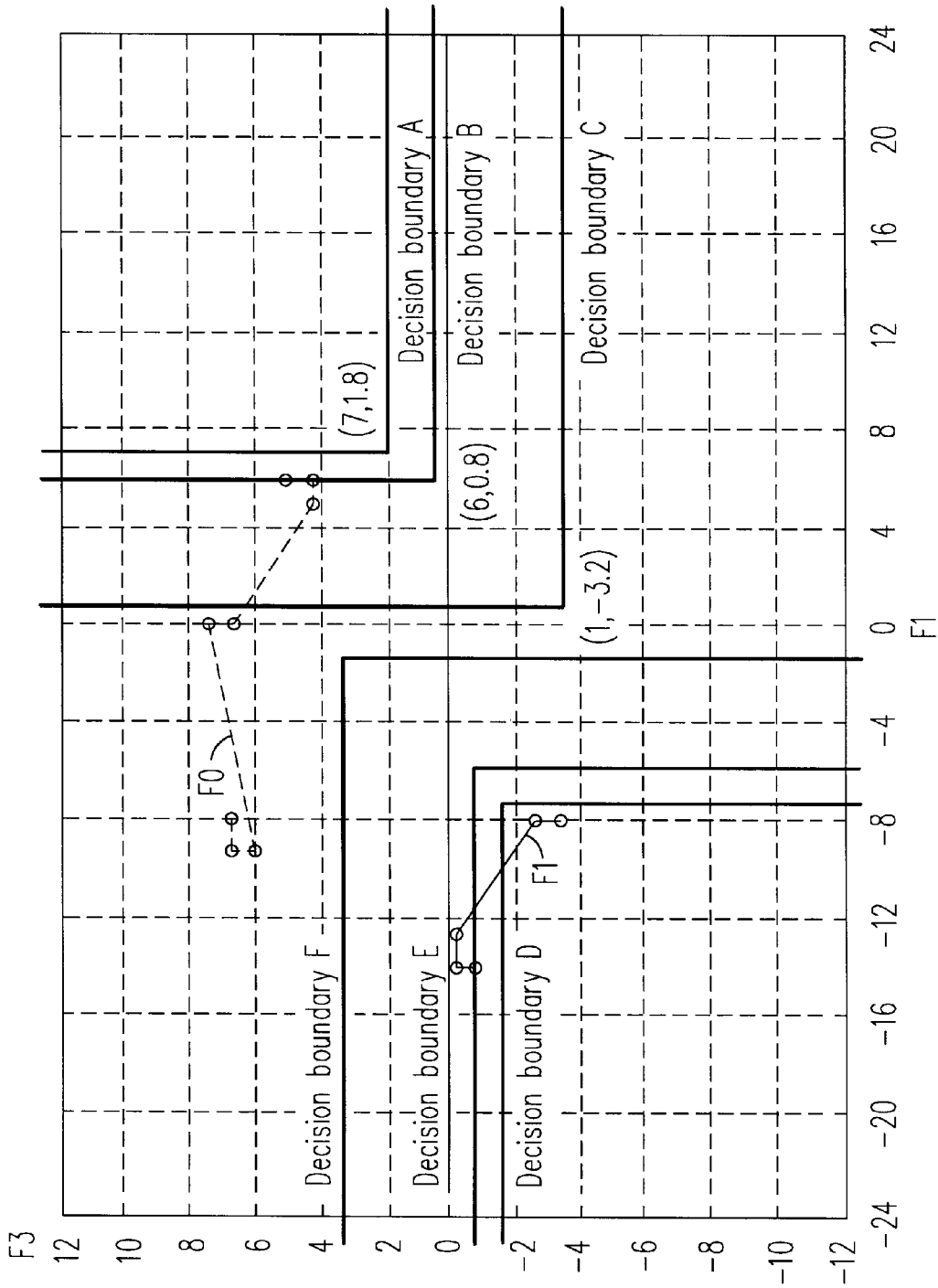
FIG. 14 is a diagram showing the relationship between the values of F1, F2, and F3 and decision boundaries (for signal points F1 and F0)

Initially the relationship between the previously used F1, F2, and F3 and decision boundary is shown in FIGS. 7 through 14. FIGS. 7 and 8 show a case where the state of the inter-symbol interference is in states of A and B. FIGS. 9 and 10 show a case where the state of the inter-symbol interference is in a state of C. FIGS. 11 and 12 show a case where the state of the inter-symbol interference is in states of D and E. FIGS. 13 and 14 show a case where the state of the inter-symbol interference is in a state of F. For example, the points indicated as A0 in FIG. 7 (hereinafter referred to as signal points) are points plotted when the state of the inter-symbol interference is in "A" and also when there is an input waveform which indicates that the decoding result is zero. The points indicated as D1 in FIG. 12 are points plotted when the state of the inter-symbol interference is in "D" and also when there is an input waveform which indicates that the decoding result is −1. Also, a boundary, which is suitable for judging zero and 1, or zero and −1 in each state, is defined as a decision boundary corresponding to that state and is shown in each drawing.

In a case where there is no distortion other than inter-symbol interference, the values of c1 through c8 obtained from a read signal will be within a range of a group of points plotted in FIGS. 7 through 14, if they are calculated with F1, F2, and F3. If the values are within this point group and also are judged with an appropriate decision boundary, there will be no error in the decoding result. However, if a waveform is distorted for some influence and the decoding result varies, as shown in Table 2, there will be the possibility that the decision boundary will vary due to that influence. Even if there were no influence of the distortion of a signal waveform, it would be obvious that the decoding result will vary if the decision boundary varies. For example, in a case where inter-symbol interference is in a state of A and there is a waveform where a result of calculation where A1 or A0 is plotted occurs, decoding judgment will be correct if the decision boundary is "A." However, in a case where inter-symbol interference is in a state of A and there is an input waveform where a result of calculation where A1 or A0 is plotted occurs, there is the possibility that "1" will be judged instead of being judged as zero, when the decision boundary is "C." Such a case is detected by the boundary checking unit.

Now, conditions to be checked will be described in further detail. As described in FIG. 5, the decision boundary is determined by the selection signal generator. Therefore, a description will be made for each selection signal.

(a) Case where a selection signal indicated "A" In this case, if a signal which becomes A1 or A0 has been input, there will be no problem. Besides this case, consider a case which becomes a serious problem. Next, in order to suppress error propagation, consider preventing an occurrence of a result where a decoding result changes, that is, an occurrence of a result where zero is judged as 1, or where 1 is judged as zero. That is, even when a decoding result is judged as zero by the selector, a case, where there is an input signal where a decoding result is judged as 1 if a decision boundary is correct, should be judged as an error. Therefore, in a case where a decoding result is judged as zero by the selector and also signal points are C1, the signal points are distributed beyond the decision boundary A, as shown in FIGS. 9 and 10, and consequently, if this boundary is used, there will be the possibility that a decoding error will occur, thus this case should also be judged as an error. In addition, because there is the possibility that D1, E1, and F1 are also judged as zero for all signal points, this case should also be judged as an error. But, for B1 or B0, there is the high possibility that a decoding result will not change even when a decision boundary is A, and consequently, this case is ignored in this embodiment (see FIGS. 7 and 8).

In a case where the selector judges that a decoding result is 1, there is the possibility that F0 will be zero (see FIGS. 13 and 14). This is because F0 is near to the decision boundary A and because, when a signal is slightly distorted, there are some cases where F0 gets into the decision boundary A.

From the foregoing description, when a signal is decoded as zero, it needs to be confirmed that the signal point is not C1, D1, E1, or F1. Also, when a signal is decoded as 1, it needs to be confirmed that the signal point is not F0.

(b) Case where a selection signal indicated "B" In this case, as with the case of the aforementioned A, when the selector judges that a decoding result is zero, it needs to be confirmed that the signal point is not C1, D1, E1, or F1. In addition, in a case where the selector judges that a decoding result is 1, it needs to be confirmed that the signal point is not F0. This is because the decision boundary B is close to the boundary A and is under nearly the same condition as the boundary A (see FIGS. 9, 10, 13, and 14).

(c) Case where a selection signal indicated "C" In a case where the selector judges that a decoding result is 0, the signal point which must be confirmed is shown in FIGS. 11 and 12 and is D1 and E1 which will become zero if the decision boundary C is used as a reference. Likewise, the signal point is F1 shown in FIGS. 13 and 14. In a case where the signal point is A1 or B1, there is no problem because a decoding result would be judged as 1 even if the decision boundary were C (see FIGS. 7 and 8). On the other hand, in a case where the selector judges that a decoding result is 1, the signal point which must be confirmed is A0 and B0 which get into the decision boundary C in FIGS. 7 and 8, D0 and E0 where the signal points are distributed in the vicinity of the decision boundary C, and is F0 which gets into the decision boundary C in FIGS. 13 and 14.

(d) Case where a selection signal indicated "D" This case becomes symmetrical with the case where a selection signal indicated A. That is, in a case where the selector judges that a decoding result is 0, the signal point which must be confirmed is A1, B1 and C1 which are outside and far away from the decision boundary D, as shown in FIGS. 7 through 10, and the signal point is F1 which gets into the decision boundary D, as shown in FIGS. 13 and 14. Also, in a case where the selector judges that a decoding result is −1, the signal point which must be confirmed is C0 which is close to the decision boundary D.

(e) Case where a selection signal indicated "E" In the same way where the selection signal B is similar to the selection signal A, the case where the selection signal is E is also similar to the selection signal D. In a case where the selector judges that a decoding result is zero, it must be confirmed that the signal point is not A1, B1, C1, or F1. In a case where the selector judges that a decoding result is −1, it must be confirmed that the signal point is not C0.

(f) Case where a selection signal indicated "F" In a case where the selector judges that a decoding result is 0, the signal point which must be confirmed is A1, B1 and C1 shown in FIGS. 7 through 10. Also, in a case where the selector judges that a decoding result is −1, the signal point which must be confirmed is A0 and B0 which are close to the decision boundary F in FIGS. 7 and 8 and C0, D0, and E0 which get into the decision boundary F in FIGS. 9 and 12.

From the foregoing description it follows that the signal points which must be confirmed exist in each case. If a signal point does not correspond to the signal points which must be confirmed, it will be highly probable that no error will occur. On the other hand, if it corresponds to those which must be confirmed, it will be highly probable that error will occur. Therefore, the aforementioned new function F4 is introduced for separation of whether a signal point is a signal point to be confirmed, thereby making the separation easier.

FIGS. 15 through 20 show how separation becomes possible by using the new function F4. In the figures, the axis of ordinate represents the value of F4 and there is no axis of abscissa. For each signal point, a range where it can exist with F4 as a reference is shown by a block.

Figure 15:
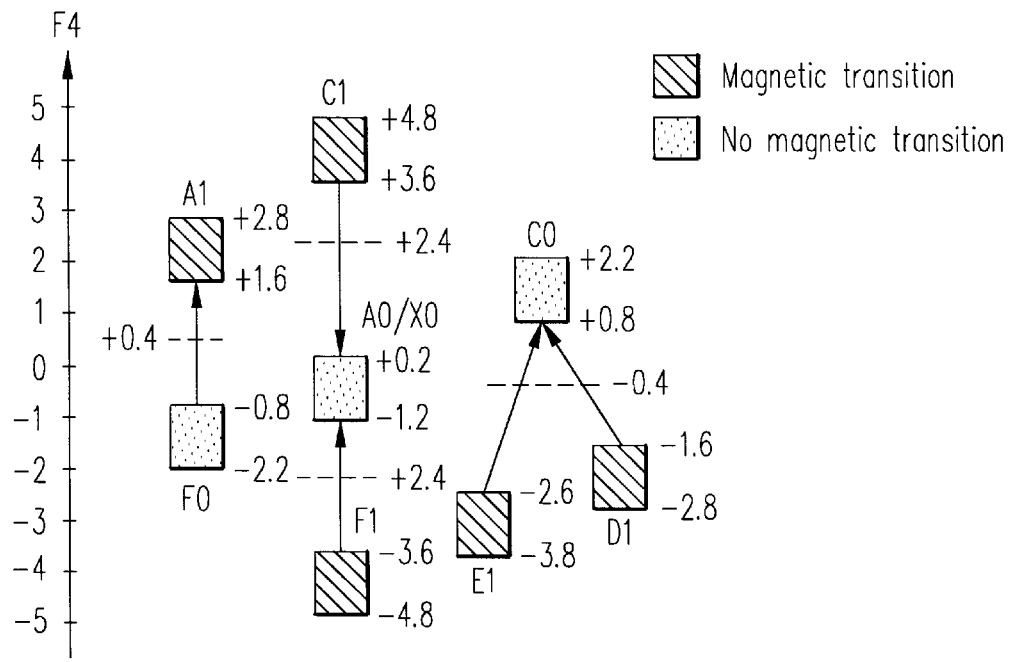
FIG. 15 is a diagram showing the decision reference in a case where F4 is used for separating signal points (for a decision boundary A)

FIG. 15 shows the separation of signal points to be confirmed in the case of the decision boundary A. The point to be judged in the decision boundary A is C1, D1, E1, and F1 for A0 and F0 for A1. For A0 and C1, it is confirmed that the values of F1, F2, and F3, representative of points to be confirmed, belong to an area where they are judged as 1 by using the decision boundary C, and then, if F4 is used, it will be found that A0 and C1 can be judged with +2.4 as a reference. Also, for A0 and F1, it is confirmed that the values of F1, F2, and F3, representative of points to be confirmed, belong to an area where they are judged as −1 by using the decision boundary F, and then, if F4 is used, A0 and F1 can be judged with −2.4 as a reference. For A0, D1, and E1, it is confirmed that the values of F1, F2, and F3, representative of points to be confirmed, belong to an area where they are judged as −1 by using the decision boundary D, and then C0 is used instead of A0 because both are away from each other. If F4 is used, then C0, D1 and E1 can be judged with −0.4 as a reference. Likewise, A1 and F0 can be judged with +0.4 as a reference by using F4.

Figure 16:
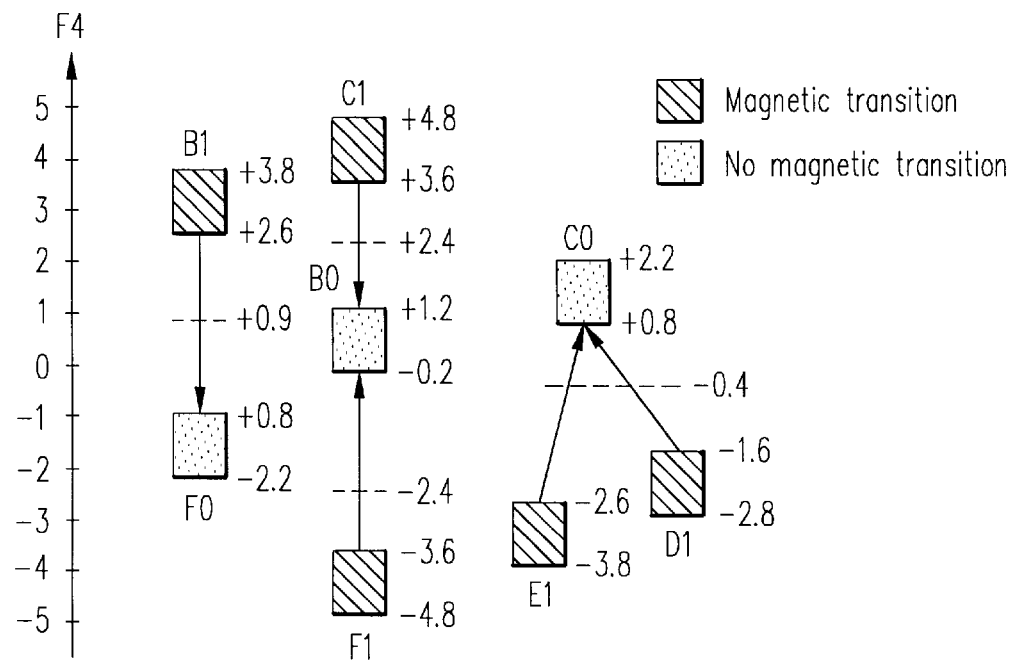
FIG. 16 is a diagram showing the decision reference in a case where F4 is used for separating signal points (for a decision boundary B)

FIG. 16 shows the separation of signal points to be confirmed in the case of the decision boundary B. Because the decision boundaries B and A are similar to each other, as previously described, the point to be judged from B0 and B1 is the same as A0 and A1. Even if F4 were introduced, the method of the judgment would be the same, except for part of the method.

Figure 17:
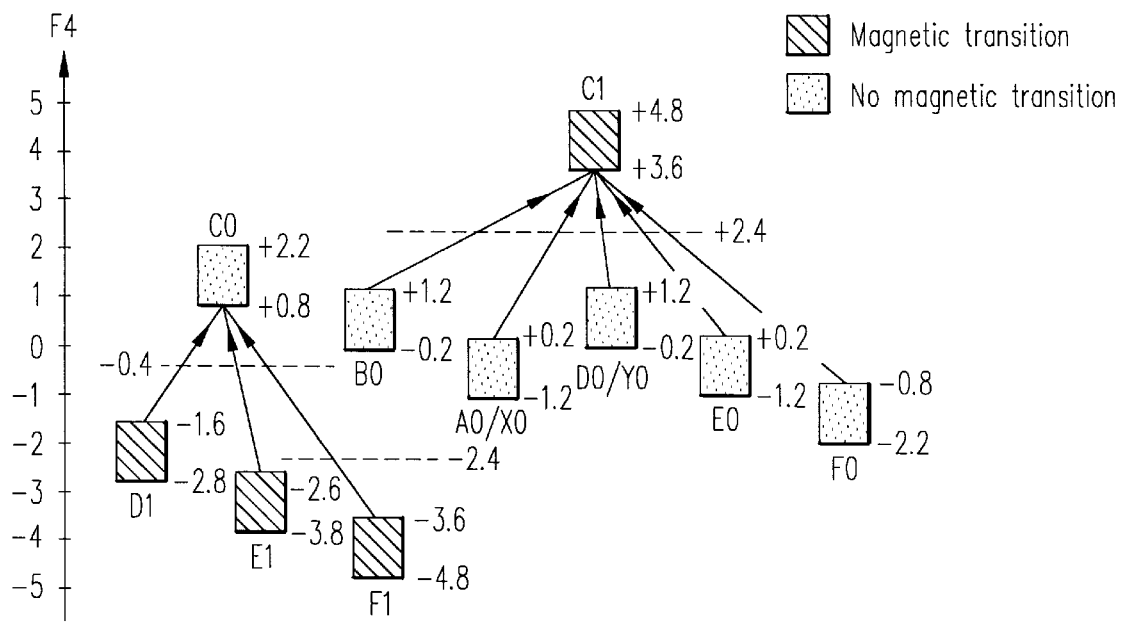
FIG. 17 is a diagram showing the decision reference in a case where F4 is used for separating signal points (for a decision boundary C)

FIG. 17 shows the separation of signal points to be confirmed in the case of the decision boundary C. The signal point to be confirmed for C0 is D1, E1, and F1, and the signal point to be confirmed for C1 is A0, B0, D0, E0, and F0. For C0, D1, and E1, it is confirmed that the values of F1, F2, and F3, representative of points to be confirmed, belong to an area where they are judged as −1 by using the decision boundary D, and then, if F4 is used, C0, D1, and E1 can be judged with −0.4 as a reference. Also, for C0 and F1, it is confirmed that the values of F1, F2, and F3, representative of points to be confirmed, belong to an area where they are judged as −1 by using the decision boundary F, and then, if F4 is used, C0 and F1 can be judged with −2.4 as a reference. Furthermore, For C1 and A0, B0, D0, E0, and F0, it is confirmed that the values of F1, F2, and F3, representative of points to be confirmed, belong to an area where they are judged as 0 by using the decision boundary A, and then, if F4 is used, they can be judged with +2.4 as a reference.

Figure 18:
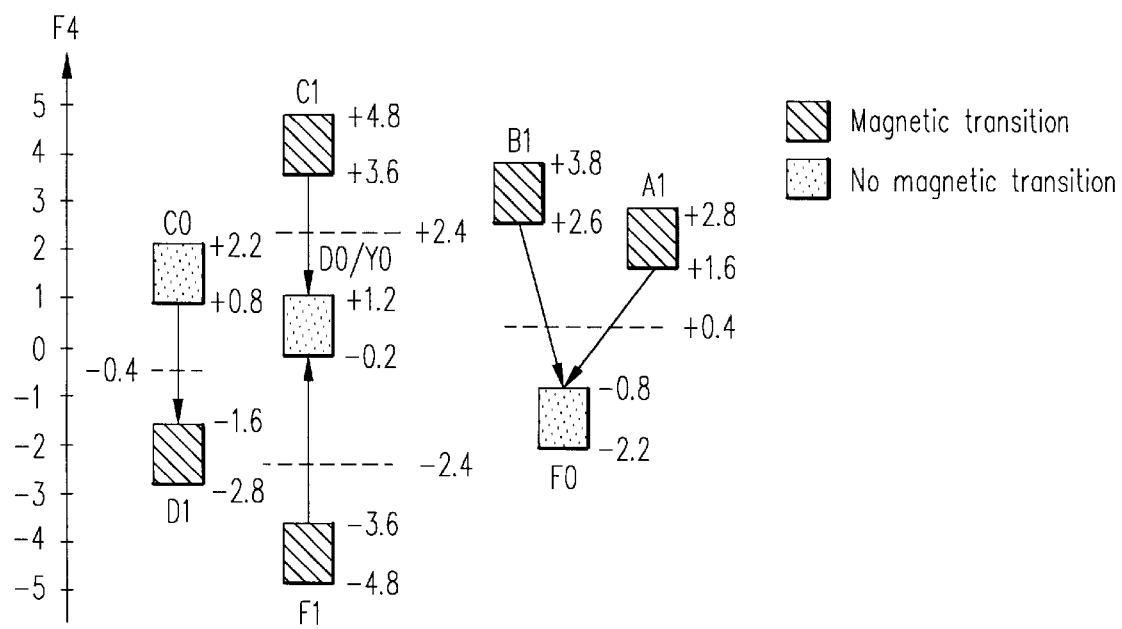
FIG. 18 is a diagram showing the decision reference in a case where F4 is used for separating signal points (for a decision boundary D)

FIG. 18 shows the separation of signal points to be confirmed in the case of the decision boundary D. For D0, A1, and B1, it is confirmed that the values of F1, F2, and F3, representative of points to be confirmed, belong to an area where they are judged as 1 by using the decision boundary A, and then F0 is compared instead of D0 because D0 is far away from A1 and B1. If F4 is used, D0, A1, and B1 can be judged with +0.4 as a reference. For D0 and C1, it is confirmed that the values of F1, F2, and F3, representative of points to be confirmed, belong to an area where they are judged as 1 by using the decision boundary C, and then, if F4 is used, D0 and C1 can be judged with +2.4 as a reference. Also, for D0 and F1, it is confirmed that the values of F1, F2, and F3, representative of points to be confirmed, belong to an area where they are judged as 1 by using the decision boundary F, and then, if F4 is used, D0 and F1 can be judged with −2.4 as a reference. Furthermore, by using F4, D1 and C0 can be judged with −0.4 as a reference.

Figure 19:
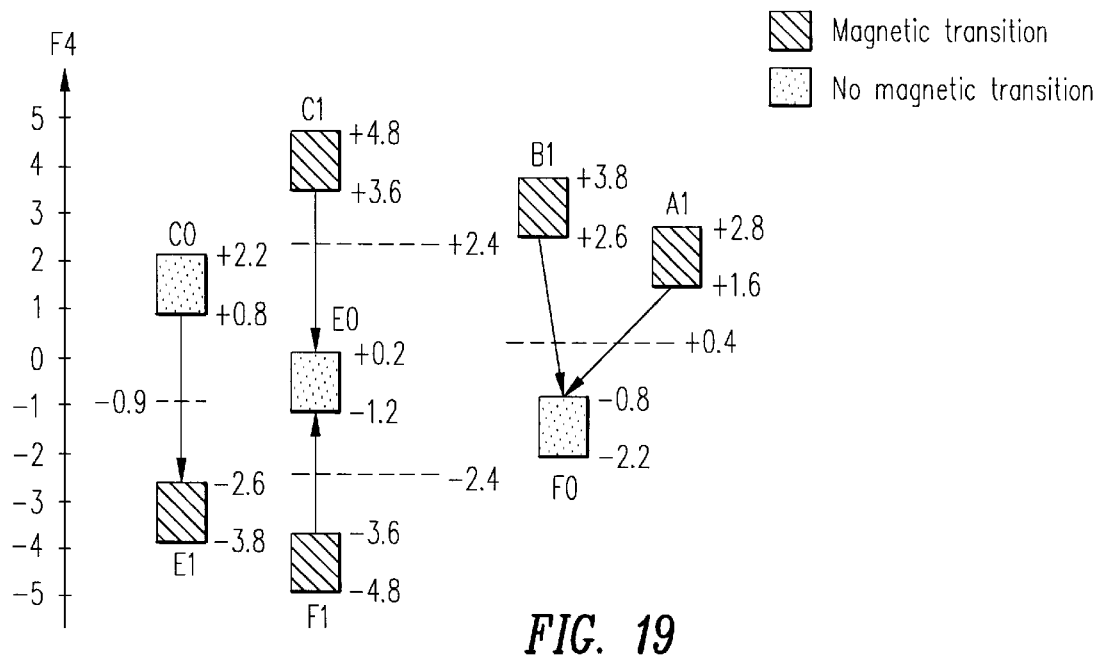
FIG. 19 is a diagram showing the decision reference in a case where F4 is used for separating signal points (for a decision boundary E)

FIG. 19 shows the separation of signal points to be confirmed in the case of the decision boundary E. Because the decision boundaries D and E are similar to each other, as previously described, the point to be judged from E0 and E1 is the same as D0 and D1. Even if F4 were introduced, the method of the judgment would be the same, except for part of the method.

Figure 20:
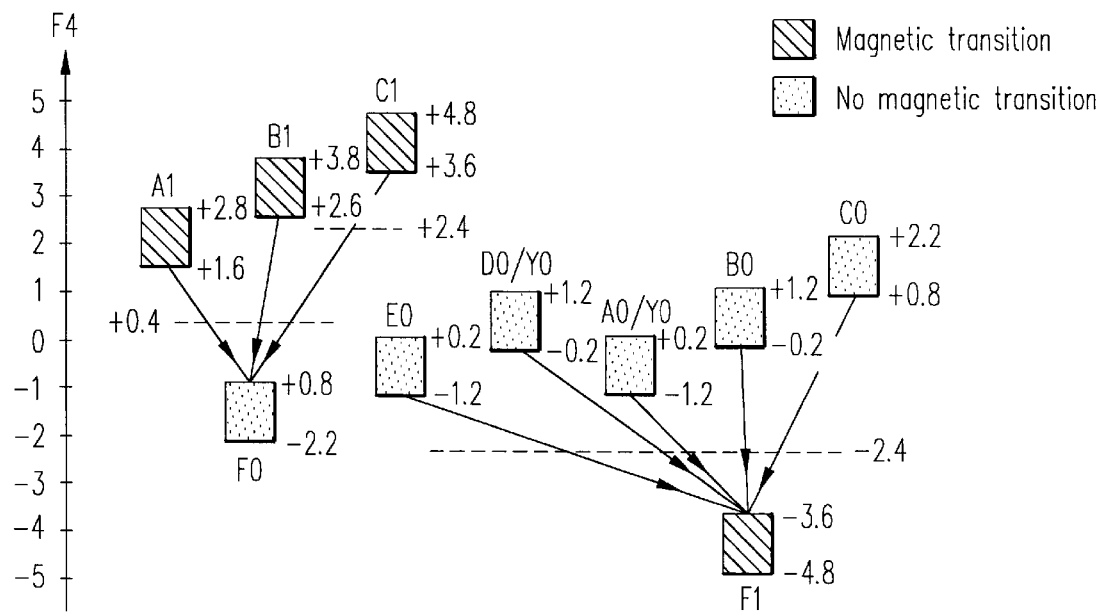
FIG. 20 is a diagram showing the decision reference in a case where F4 is used for separating signal points (for a decision boundary F).

FIG. 20 shows the separation of signal points to be confirmed in the case of the decision boundary E. For F0, A1, and B1, it is confirmed that the values of F1, F2, and F3, representative of points to be confirmed, belong to an area where they are judged as 1 by using the decision boundary A, and then, if F4 is used, they can be judged with +0.4 as a reference. Also, for F0 and C1, it is confirmed that the values of F1, F2, and F3, representative of points to be confirmed, belong to an area where they are judged as 1 by using the decision boundary C, and then, if F4 is used, F0 and C1 can be judged with +2.4 as a reference. Furthermore, for F1 and for A0, B0, C0, and E0, it is confirmed that the values of F1, F2, and F3, representative of points to be confirmed, belong to an area where they are judged as zero by using the decision boundary D, and then, if F4 is used, they can be judged with −2.4 as a reference.

The aforementioned judgment conditions of the separation will become as shown in Table 3.

TABLE 3

| State | Decoding Result | Error Conditions |
| --- | --- | --- |
| A | 0 | (F1, F2, F3) in D and F4 < −0.4 |
|   |   | (F1, F2, F3) in F and F4 < −2.4 |

TABLE 3-continued

| State | Decoding Result | Error Conditions |
|---|---|---|
|  |  | (F1, F2, F3) in C and F4 < +2.4 |
|  | 1 | F4 < +0.4 |
| B | 0 | (F1, F2, F3) in D and F4 < −0.4 |
|  |  | (F1, F2, F3) in F and F4 < −2.4 |
|  |  | (F1, F2, F3) in C and F4 < +2.4 |
|  | 1 | F4 < +0.9 |
| C | 0 | (F1, F2, F3) in D and F4 < −0.4 |
|  |  | (F1, F2, F3) in F and F4 < −2.4 |
|  | 1 | (F1, F2, F3) out A and F4 < +2.4 |
| D | 0 | (F1, F2, F3) in A and F4 > +0.4 |
|  |  | (F1, F2, F3) in C and F4 > +2.4 |
|  |  | (F1, F2, F3) in F and F4 < −2.4 |
|  | 1 | F4 > −0.4 |
| E | 0 | (F1, F2, F3) in A and F4 > +0.4 |
|  |  | (F1, F2, F3) in C and F4 > +2.4 |
|  |  | (F1, F2, F3) in F and F4 < −2.4 |
|  | 1 | F4 > −0.9 |
| F | 0 | (F1, F2, F3) in A and F4 > +0.4 |
|  |  | (F1, F2, F3) in C and F4 > +2.4 |
|  | 1 | (F1, F2, F3) in D and F4 > −2.4 |

In Table 3, the "(F1, F2, F3) in A" indicates that the values of F1, F2, and F3, representative of points to be confirmed, belong to an area where they are judged as 1 by using the decision boundary A. The "(F1, F2, F3) out A" indicates that the values of F1, F2, and F3, representative of points to be confirmed, belong to an area where they are judged as zero by using the decision boundary A.

Judgment such as this is performed by the boundary checking units 1 through 4 shown in FIG. 6. If an error is detected, then an error signal will be generated. In response to this error signal, there is the possibility that the following operation will be performed.

(1) It is judged that a serious error has occurred in a decoded signal, and data transmission is stopped.

(2) A judging area is corrected after an error occurs in correspondence with the state of inter-symbol interference which is assumed to be accurate.

Also, it is considered that a combination of the above operations is employed. For example, first, reading is performed by the method (1). In a case where an error cannot be corrected by a Reed-Solomon coding being widely used and in a case where an error cannot be corrected by ERP (error recovery procedure) other than the Reed-Solomon coding, reading is performed by the method (2). In addition, only in a case where an error occurs in a specific decision boundary, reading is performed by the method (2). But, in the present invention, a description has been made of a case where an error is detected.

As described above, even if an error occurred in the judgment of the decision boundary, the result of the error could be prevented from having an influence on a subsequent decoding. In the case of the example of Table 2, an error is detected at the position of bit 6 indicated by an arrow in the column "Error."

Note that the present invention is not limited to the aforementioned embodiment. In this embodiment, since the (1, 7) RLL recording codes have been employed and F1, F2, and F3 have been defined as described above, an error has been detected with the conditions shown in Table 3. But, the (1, 7) coding method and F1, F2, and F3 may be defined in some other form so that the conditions of Table 3 and F4 are determined in some other form.

As has been described above, there can be provided an error propagation suppressing method which is effective when it is used in PRML.

In addition, there can be provided a mechanism for judging whether a suitable reference value is selected when the reference value of PRML is changed.

I claim:

1. A decoder for suppressing error propagation, comprising:

a plurality of product-sum arithmetic units each for performing a predetermined product-sum operation for a value of an input signal;

inside-outside judging means for judging whether the result of the operation performed by each of the plurality of product-sum arithmetic units is within a predetermined range and outputting an inside-outside judgment;

selecting means for selecting the predetermined range, based on a known bit sequence and a coding method; and error judging means for judging whether the selecting means selected an incorrect range, using the selected predetermined range, the inside-outside judgment, and the value of the input signal.

2. The decoder of claim 1, wherein the error judging means includes means for determining whether the result of the operation performed by each of the plurality of product-sum arithmetic units is outside a distribution of signal points corresponding to the predetermined range selected by the selecting means.

3. The decoder of claim 2, wherein the means for determining includes a product-sum arithmetic unit for ensuring that the result of the operation is outside the distribution, using the value of the input signal.

4. The decoder of claim 2, further comprising an error propagation judging means for judging whether the result of the operation performed by each of the plurality of product-sum arithmetic units belongs to a range where the inside-outside judgment becomes a different result, when the result of the operation is ouside the distribution of signal points.

5. The decoder of claim 4, wherein the means for detecting error propagation comprises a boundary checking unit, the boundary checking unit outputting a propagation error signal when the result of the operation performed by each of the plurality of product-sum arithmetic units belongs to a range where the inside-outside judgment becomes a different result.

6. A decoder for suppressing error propagation, comprising:

a plurality of product-sum arithmetic units, each calculating and outputting a result of a predetermined product-sum operation for an input signal;

a comparator-logic group, coupled to the plurality of product-sum arithmetic units, for determining whether the results of the plurality of product-sum arithmetic units are within a predetermined decision boundary range and outputting an inside-outside judgment; and a digital signal processing unit, coupled to the comparator-logic group, for outputting a decoded bit based on a previously decoded bit, a coding method, and the output of the comparator-logic group, the digital signal processing unit including a selection signal generator for selecting the predetermined decision boundary range based on the previously decoded bit and the coding method.

7. The decoder of claim 6, further comprising:

error propagation detection means, coupled to the plurality of product-sum arithmetic units, the comparator-logic group and the selection signal generator, for detecting error propagation.

8. The decoder of claim 7, wherein the error propagation means detects an error when the result of the operation performed by each of the plurality of product-sum arithmetic units belongs to one of a set of predetermined decision boundary ranges where the inside-outside judgment changes, using the input signal, the output of the comparator-logic group and the result of the plurality of product-sum arithmetic units.

9. A method for suppressing error propagation, comprising the steps of:

calculating a product-sum for a value of an input signal;

judging whether the calculated product-sum is within a predetermined range and outputting an inside-outside judgment;

selecting the predetermined range, based on a known bit sequence and a coding method; and judging whether the predetermined range is incorrect using the selected predetermined range, the inside-outside judgment, and the value of the input signal.

10. The method of claim 9, further comprising the step of:

determining whether the calculated product-sum is outside a distribution of signal points corresponding to the selected predetermined range.

11. The method of claim 9, further comprising the step of:

determining whether the calculated product-sum is belongs to a distribution of signal points where the inside-outside judgment would change.

12. The method of claim 11, further comprising the step of:

correcting the selected predetermined range.

13. A disk drive comprising:

a disk;

a head for reading a signal from the magnetic disk and converting the signal to an electrical signal;

a plurality of integrators, coupled to the head, outputting a signal value for the electrical signal from the head;

a plurality of product-sum arithmetic units each for performing a predetermined product-sum operation for the signal value;

inside-outside judging means for judging whether the result of the operation performed by each of the plurality of product-sum arithmetic units is within a predetermined range and outputting an inside-outside judgment;

selecting means for selecting the predetermined range, based on a known bit sequence and a coding method; and error judging means for judging whether the selecting means selected an incorrect range, using the selected predetermined range, the inside-outside judgment, and the signal value.

14. The disk drive of claim 13, wherein the error judging means includes means for determining whether the result of the operation performed by each of the plurality of product-sum arithmetic units is outside a distribution of signal points corresponding to the predetermined range selected by the selecting means.

15. The disk drive of claim 14, wherein the means for determining includes a product-sum arithmetic unit for ensuring that the result of the operation is outside the distribution, using the signal value.

16. The disk drive of claim 14, further comprising an error propagation judging means for judging whether the result of the operation performed by each of the plurality of product-sum arithmetic units belongs to a range where the inside-outside judgment becomes a different result, when the result of the operation is ouside the distribution of signal points.

17. The disk drive of claim 16, wherein the means for detecting error propagation comprises a boundary checking unit, the boundary checking unit outputting a propagation error signal when the result of the operation performed by each of the plurality of product-sum arithmetic units belongs to a range where the inside-outside judgment becomes a different result.

* * * * *